US012628109B2

(12) United States Patent
Ren et al.

(10) Patent No.: US 12,628,109 B2
(45) Date of Patent: May 12, 2026

(54) POSITIONING METHOD AND APPARATUS

(71) Applicant: DATANG MOBILE COMMUNICATIONS EQUIPMENT CO., LTD., Beijing (CN)

(72) Inventors: Bin Ren, Beijing (CN); Ren Da, Beijing (CN); Xiaotao Ren, Beijing (CN); Zheng Zhao, Beijing (CN); Gang Li, Beijing (CN); Hui Li, Beijing (CN); Zhenyu Zhang, Beijing (CN); Rongyi Fang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 508 days.

(21) Appl. No.: 18/012,829

(22) PCT Filed: Jun. 25, 2021

(86) PCT No.: PCT/CN2021/102302
§ 371 (c)(1),
(2) Date: Dec. 23, 2022

(87) PCT Pub. No.: WO2022/001858
PCT Pub. Date: Jan. 6, 2022

(65) Prior Publication Data
US 2023/0262647 A1 Aug. 17, 2023

(30) Foreign Application Priority Data
Jun. 29, 2020 (CN) .......................... 202010606012.4

(51) Int. Cl.
| | |
|---|---|
| *H04W 64/00* | (2009.01) |
| *H04L 5/00* | (2006.01) |
| *H04W 24/10* | (2009.01) |

(52) U.S. Cl.
CPC ........... *H04W 64/00* (2013.01); *H04L 5/0051* (2013.01); *H04W 24/10* (2013.01)

(58) Field of Classification Search
CPC ..... H04W 64/00; H04W 24/10; H04W 4/025; H04W 64/006; H04W 56/0015;
(Continued)

(56) References Cited

U.S. PATENT DOCUMENTS

| | | | |
|---|---|---|---|
| 2011/0183626 A1 | 7/2011 | Das | |
| 2016/0095080 A1* | 3/2016 | Khoryaev ............. | G01S 5/0284 455/456.1 |

(Continued)

FOREIGN PATENT DOCUMENTS

| | | |
|---|---|---|
| CN | 102869038 A | 1/2013 |
| CN | 105325037 A | 2/2016 |

(Continued)

OTHER PUBLICATIONS

Intel Corporation, "Remaining Details of Physical Layer Measurements for NR Positioning" 3GPP TSG RAN WG1 Meeting R1-1910676 3GPP, Oct. 14-20, 2019, 21 pages.
(Continued)

*Primary Examiner* — Kabir A Timory
(74) *Attorney, Agent, or Firm* — Meunier Carlin & Curfman LLC

(57) ABSTRACT

Disclosed are a positioning method and apparatus, which are used for eliminating a clock skew between base stations and improving the UE positioning accuracy of an UL-TDOA/DL-TDOA positioning technical scheme. The method comprises: determining positioning reference signal configuration information; for a downlink time difference of arrival (DL-TDOA) positioning technical scheme, receiving and measuring downlink positioning reference signals from different base stations on the basis of the positioning reference (Continued)

signal configuration information, determining downlink positioning measurement quantity information, and reporting the downlink positioning measurement quantity information and location information of a reference terminal; and for an uplink time difference of arrival (UL-TDOA) positioning technical scheme, sending an uplink positioning reference signal on the basis of the positioning reference signal configuration information, and sending the location information of the reference terminal.

18 Claims, 7 Drawing Sheets

(58) Field of Classification Search
CPC .... H04W 4/029; H04L 5/0051; H04L 5/0048; G01S 5/0036; G01S 5/021; G01S 5/0236; G01S 5/0244; G01S 5/06; G01S 5/10
See application file for complete search history.

(56) References Cited

U.S. PATENT DOCUMENTS

| | | | |
|---|---|---|---|
| 2017/0078990 A1 | 3/2017 | Chu et al. | |
| 2017/0079006 A1 | 3/2017 | Li | |
| 2017/0142682 A1 | 5/2017 | Gunnarsson et al. | |
| 2017/0332192 A1 | 11/2017 | Edge | |
| 2018/0306897 A1 | 10/2018 | Xue et al. | |
| 2019/0230618 A1* | 7/2019 | Saur .................... | H04W 56/001 |
| 2020/0137715 A1 | 4/2020 | Edge et al. | |
| 2020/0408871 A1 | 12/2020 | Da et al. | |
| 2021/0072340 A1 | 3/2021 | Wang et al. | |
| 2021/0219254 A1 | 7/2021 | Wang et al. | |
| 2021/0337496 A1 | 10/2021 | Da et al. | |
| 2021/0368468 A1 | 11/2021 | Xing et al. | |
| 2021/0377697 A1* | 12/2021 | Yerramalli ............ | H04L 5/0035 |

FOREIGN PATENT DOCUMENTS

| | | | |
|---|---|---|---|
| CN | 106877965 A | 6/2017 | |
| CN | 107852582 A | 3/2018 | |
| CN | 109196925 A | 1/2019 | |
| CN | 109392000 A | 2/2019 | |
| CN | 110062457 A | 7/2019 | |
| CN | 110730501 A | 1/2020 | |
| CN | 110972054 A | 4/2020 | |
| CN | 111131997 A | 5/2020 | |
| JP | 2009528546 A | 8/2009 | |
| JP | 2018525912 A | 9/2018 | |
| KR | 20200032107 A | 3/2020 | |
| WO | 2016032265 A1 | 3/2016 | |
| WO | 2017113072 A1 | 7/2017 | |
| WO | 2019062337 A1 | 4/2019 | |
| WO | 2019191318 A1 | 10/2019 | |
| WO | 2020026211 A1 | 2/2020 | |
| WO | 2020063393 A1 | 4/2020 | |

OTHER PUBLICATIONS

CATT, "Further discussion of NR RAT-dependent DL Positioning" 3GPP TSG RAN WG1 Meeting R1-1901980 3GPP, Feb. 25-Mar. 1, 2019, 31 pages.

CAT: "Discussion of NR positioning enhancements" [online] 3GPP TSG RAN WG1 #101-e R1-2003642 , Internet<URL:https://www.3gpp.org/ftp/tsg_ran/WG1_RL1/TSGR1_101-e/Docs/R1-2003642.zip May 25-Jun. 5, 2020.

Fraunhofer Iis et al: "NR beam management supporting multi-gNB measurements for positioning", 3GPP Draft; R1-1813583-NR-Multi-TRP-Beam-Management-for-TDOA-Positi Oning, 3rd Generation Partnership Project (3GPP), Mobile Competence Centre; 650, Route Des Lucioles; F-06921 Sophia• Antipolis Cedex, vol. RAN WG1, No. Spokane, US; Nov. 12, 2018-Nov. 16, 2018; Nov. 11, 2018, XP051555639.

CATT: "NR RAT-dependent DL Positioning", 3GPP Draft; R1-190031 0_NR RAT-Dependent DL Positioning, 3rd Generation Partnership Project (3GPP), Mobile Competence Centre ; 650, Route Des Lucioles ; F-06921 Sophia-Antipolis Cedex ; France, vol. RAN WG1, No. Taipei; Jan. 21, 2019-Jan. 25, 2019 Jan. 20, 2019, XP051593224.

Qualcomm Incorporated; Discussion of "Combined Downlink and Uplink NR Positioning Procedures" 3GPP TSG-RAN WG2 #104 R2-1817899; Spokane, US; Nov. 12, 2018-Nov. 16, 2018; Nov. 11, 2018.

Korean Office Action dated Apr. 25, 2025, Korean Application No. 10-2023-7002652.

Government of India Hearing Notice in Reference of Application No. 202327004122, Nov. 13, 2025 (4 pages).

* cited by examiner

Reference
base
station #1

Non-reference
base station #2

LMF

First UE#a
(Reference
UE)

Second UE#c
(Target UE)

Downlink Positioning Reference Signal
(PRS)

Positioning measurement (TDOA and/
or TOA) and location information of
reference UE reported by reference UE Positioning measurement (TDOA and/
or TOA) reported by target UE Base station #1

Base station #2

LMF

First UE#a
(Reference
UE)

First UE#b
(Reference UE)

Second UE#c
(Target UE)

Positioning Reference Signal (PRS)

Positioning measurement (TDOA and/
or TOA) and location information of
reference UE reported by reference UE Positioning measurement (TDOA and/
or TOA) reported by target UE

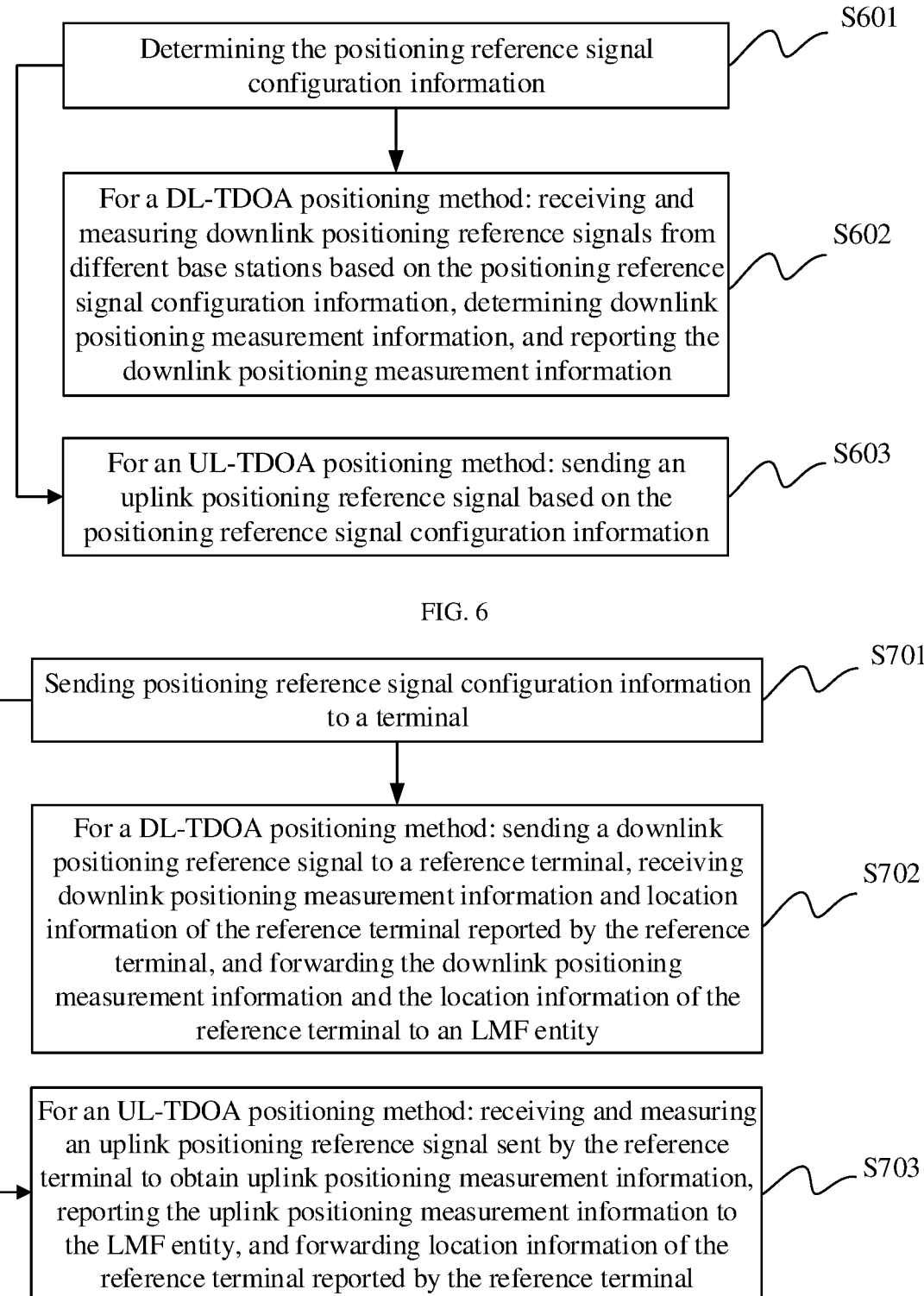

Determining the positioning reference signal configuration information                S601

For a DL-TDOA positioning method: receiving and measuring downlink positioning reference signals from different base stations based on the positioning reference signal configuration information, determining downlink positioning measurement information, and reporting the downlink positioning measurement information                S602

For an UL-TDOA positioning method: sending an uplink positioning reference signal based on the positioning reference signal configuration information                S603

FIG. 6

Sending positioning reference signal configuration information to a terminal                S701

For a DL-TDOA positioning method: sending a downlink positioning reference signal to a reference terminal, receiving downlink positioning measurement information and location information of the reference terminal reported by the reference terminal, and forwarding the downlink positioning measurement information and the location information of the reference terminal to an LMF entity                S702

For an UL-TDOA positioning method: receiving and measuring an uplink positioning reference signal sent by the reference terminal to obtain uplink positioning measurement information, reporting the uplink positioning measurement information to the LMF entity, and forwarding location information of the reference terminal reported by the reference terminal                S703

FIG. 7

POSITIONING METHOD AND APPARATUS

CROSS-REFERENCE OF RELATED APPLICATIONS

The application is a US National Stage of International Application No. PCT/CN2021/102302, filed on Jun. 25, 2021, which claims the priority from Chinese Patent Application No. 202010606012.4, filed with the China National Intellectual Property Administration on Jun. 29, 2020 and entitled "Positioning Method and Apparatus", which is hereby incorporated by reference in its entirety.

TECHNICAL FIELD

The application relates to the field of communication technologies, and particularly to a positioning method and apparatus.

BACKGROUND

The 3rd Generation Partnership Project (3GPP) defines various User Equipment (UE) positioning methods by measuring the Positioning Reference Signal (PRS) of the 3GPP wireless communication system, such as: Downlink Time Difference Of Arrival (DL-TDOA), Uplink Time Difference Of Arrival (UL-TDOA) and so on. These methods are based on the PRS of the wireless communication system itself, and can work in the environment with no positioning reference signals outside the network received.

SUMMARY

The embodiments of the present application provide a positioning method and apparatus, so as to eliminate the clock offset between base stations and improve the UE positioning accuracy of the UL-TDOA/DL-TDOA positioning method.

At the reference terminal side, a positioning method provided by an embodiment of the present application includes:

determining positioning reference signal configuration information;

for a DL-TDOA positioning method: receiving and measuring downlink positioning reference signals from different base stations based on the positioning reference signal configuration information, determining downlink positioning measurement information, and reporting the downlink positioning measurement information and location information of a reference terminal, so that a Location Management Function, LMF, entity positions a target terminal based on the downlink positioning measurement information and the location information of the reference terminal;

for an Uplink Time Difference Of Arrival, UL-TDOA, positioning method: sending an uplink positioning reference signal based on the positioning reference signal configuration information, and sending the location information of the reference terminal, so that the LMF entity positions the target terminal based on the uplink positioning reference signal and the location information of the reference terminal.

Through this method, for the DL-TDOA positioning method, the downlink positioning reference signals from different base stations are received and measured based on the positioning reference signal configuration information, the downlink positioning measurement information is determined, and the downlink positioning measurement information and the location information of the reference terminal are reported; and for the UL-TDOA positioning method, the uplink positioning reference signal is sent based on the positioning reference signal configuration information, and the location information of the reference terminal is sent, so that the LMF entity can calculate a clock offset between base stations based on the location information of the reference UE and the uplink/downlink positioning measurement information reported by the reference UE, and thus eliminate the clock offset between base stations, improving the UE positioning accuracy of the UL-TDOA/DL-TDOA positioning method.

Optionally, the downlink positioning measurement information comprises: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the location information of the reference terminal is determined by the reference terminal based on pre-configured location information or through a Radio Access Technology-independent (RAT-independent) positioning scheme.

Optionally, the positioning reference signal configuration information is provided by the LMF entity or a base station.

At the LMF entity side, a positioning method provided by an embodiment of the present application includes:

for a DL-TDOA positioning method: receiving downlink positioning measurement information and location information of a reference terminal reported by the reference terminal, and receiving downlink positioning measurement information reported by a target terminal; and positioning the target terminal based on the downlink positioning measurement information and the location information of the reference terminal reported by the reference terminal as well as the downlink positioning measurement information reported by the target terminal; and/or for an UL-TDOA positioning method: receiving location information of a reference terminal reported by the reference terminal, and receiving uplink positioning measurement information of the reference terminal reported by a base station and uplink positioning measurement information of the target terminal reported by the base station; and positioning the target terminal based on the uplink positioning measurement information of the reference terminal, the location information of the reference terminal, and the uplink positioning measurement information of the target terminal.

Optionally, the positioning the target terminal based on the downlink positioning measurement information and the location information of the reference terminal reported by the reference terminal as well as the downlink positioning measurement information reported by the target terminal, includes:

determining a clock offset between base stations according to the obtained location information and the downlink positioning measurement information of the reference terminal;

modifying the downlink positioning measurement information of the target terminal according to the clock offset to determine modified downlink positioning measurement information of the target terminal;

determining location information of the target terminal according to the modified downlink positioning measurement information of the target terminal.

Optionally, the positioning the target terminal based on the uplink positioning measurement information of the reference terminal and the location information of the reference terminal reported by the base station as well as the uplink positioning measurement information of the target terminal reported by the base station, includes:

determining a clock offset between base stations according to the obtained location information and the uplink positioning measurement information of the reference terminal;

modifying the uplink positioning measurement information of the target terminal according to the clock offset to determine modified uplink positioning measurement information of the target terminal;

determining location information of the target terminal according to the modified uplink positioning measurement information of the target terminal.

Optionally, the modified downlink positioning measurement information includes: a downlink Reference Signal Time Difference (RSTD) measurement.

Optionally, before obtaining the location information and the downlink positioning measurement information of the reference terminal, the method further includes:

sending downlink positioning reference signal configuration information to a terminal; or sending the downlink positioning reference signal configuration information to the base station, so that the base station forwards the downlink positioning reference signal configuration information to the terminal.

Optionally, modifying the downlink positioning measurement information of the target terminal according to the clock offset to determine the modified downlink positioning measurement information of the target terminal, specifically includes:

notifying the base station of the clock offset so that the base station sends a downlink positioning reference signal to the target terminal after correcting the clock offset between base stations; and assigning an RSTD reported by the target terminal or a difference between downlink TOAs from base stations reported by the target terminal directly to a modified RSTD;

or, taking a difference between an RSTD value reported by the target terminal and the clock offset as the modified downlink positioning measurement information in a location calculation process.

Optionally, the modified uplink positioning measurement information includes an uplink Relative Time Of Arrival (RTOA) measurement.

Optionally, before obtaining the location information and the uplink positioning measurement information of the reference terminal, the method further includes:

sending uplink positioning reference signal configuration information to a terminal; or sending the uplink positioning reference signal configuration information to the base station, so that the base station forwards the uplink positioning reference signal configuration information to the terminal.

Optionally, the modifying the uplink positioning measurement information of the target terminal according to the clock offset to determine the modified uplink positioning measurement information of the target terminal, specifically includes:

notifying the base station of the clock offset so that the base station receives an uplink sounding reference signal from the target terminal after correcting the clock offset between base stations; and assigning an uplink RTOA reported by the base station directly to a modified RTOA;

or, taking a difference between an uplink RTOA value reported by the base station with respect to the target terminal and the clock offset as the modified uplink positioning measurement information in a location calculation process.

At the target terminal side, a positioning method provided by an embodiment of the present application includes:

determining positioning reference signal configuration information;

for a DL-TDOA positioning method: receiving and measuring downlink positioning reference signals from different base stations based on the positioning reference signal configuration information, determining downlink positioning measurement information, and reporting the downlink positioning measurement information; and/or for an UL-TDOA positioning method: sending an uplink positioning reference signal based on the positioning reference signal configuration information.

Optionally, the downlink positioning measurement information comprises: a downlink positioning measurement and/or a reliability indication of the downlink positioning measurement, wherein the reliability indication is a standard deviation and/or a variance of an error estimate value of the downlink positioning measurement to indicate reliability of the downlink positioning measurement.

Optionally, the positioning reference signal configuration information is provided by the LMF entity or a base station.

At the base station side, a positioning method provided by an embodiment of the present application includes:

sending positioning reference signal configuration information to a terminal;

for a DL-TDOA positioning method: sending a downlink positioning reference signal to a reference terminal, receiving downlink positioning measurement information and location information of the reference terminal reported by the reference terminal, and forwarding the downlink positioning measurement information and the location information of the reference terminal to a LMF entity; and/or for an UL-TDOA positioning method: receiving and measuring an uplink positioning reference signal sent by the reference terminal to obtain uplink positioning measurement information, reporting the uplink positioning measurement information to the LMF entity, and forwarding location information of the reference terminal reported by the reference terminal.

Optionally, the method further includes:

when receiving a clock offset between base stations notified by the LMF entity, correcting a clock offset of a local base station according to the clock offset between base stations;

for the DL-TDOA positioning method: sending a downlink positioning reference signal to a target terminal, receiving downlink positioning measurement information reported by the target terminal, and forwarding the downlink positioning measurement information to the LMF entity;

for the UL-TDOA positioning method: receiving and measuring an uplink positioning reference signal sent by the target terminal to obtain uplink positioning measurement information of the target terminal, and reporting the uplink positioning measurement information of the target terminal to the LMF entity.

At the reference terminal side, a positioning apparatus provided by an embodiment of the present application includes:

a memory configured to store program instructions;

a processor configured to invoke the program instructions stored in the memory and execute according to an obtained program:

determining positioning reference signal configuration information;

for a DL-TDOA positioning method: receiving and measuring downlink positioning reference signals from different base stations based on the positioning reference signal configuration information, determining downlink positioning measurement information, and reporting the downlink positioning measurement information and location information of a reference terminal, so that a LMF entity positions a target terminal based on the downlink positioning measurement information and the location information of the reference terminal; and/or for an UL-TDOA positioning method: sending an uplink positioning reference signal based on the positioning reference signal configuration information, and sending the location information of the reference terminal, so that the LMF entity positions the target terminal based on the downlink positioning measurement information and the location information of the reference terminal.

Optionally, the downlink positioning measurement information comprises: a downlink positioning measurement and/or a reliability indication of the downlink positioning measurement, wherein the reliability indication is a standard deviation and/or a variance of an error estimate value of the downlink positioning measurement to indicate reliability of the downlink positioning measurement.

Optionally, the location information of the reference terminal is determined by the reference terminal based on pre-configured location information or through an RAT-independent positioning scheme.

Optionally, the positioning reference signal configuration information is provided by the LMF entity or a base station.

At the LMF entity side, a positioning apparatus provided by an embodiment of the present application includes:

a memory configured to store program instructions;

a processor configured to invoke the program instructions stored in the memory and execute according to an obtained program:

for a DL-TDOA positioning method: receiving downlink positioning measurement information and location information of a reference terminal reported by the reference terminal, and receiving downlink positioning measurement information reported by a target terminal; and positioning the target terminal based on the downlink positioning measurement information and the location information of the reference terminal reported by the reference terminal as well as the downlink positioning measurement information reported by the target terminal; and/or for an UL-TDOA positioning method: receiving location information of a reference terminal reported by the reference terminal, and receiving uplink positioning measurement information of the reference terminal reported by a base station and uplink positioning measurement information of the target terminal reported by the base station; and positioning the target terminal based on the uplink positioning measurement information of the reference terminal, the location information of the reference terminal, and the uplink positioning measurement information of the target terminal.

Optionally, when positioning the target terminal based on the downlink positioning measurement information and the location information of the reference terminal reported by the reference terminal as well as the downlink positioning measurement information reported by the target terminal, the processor is configured to invoke the program instructions stored in the memory and execute according to an obtained program:

determining a clock offset between base stations according to the obtained location information and the downlink positioning measurement information of the reference terminal;

modifying the downlink positioning measurement information of the target terminal according to the clock offset to determine modified downlink positioning measurement information of the target terminal;

determining location information of the target terminal according to the modified downlink positioning measurement information of the target terminal.

Optionally, when modifying the uplink positioning measurement information of the target terminal according to the clock offset to determine the modified uplink positioning measurement information of the target terminal, the processor is specifically configured to invoke the program instructions stored in the memory and execute according to an obtained program:

determining a clock offset between base stations according to the obtained location information and the uplink positioning measurement information of the reference terminal;

modifying the uplink positioning measurement information of the target terminal according to the clock offset to determine modified uplink positioning measurement information of the target terminal;

determining location information of the target terminal according to the modified uplink positioning measurement information of the target terminal.

Optionally, the modified downlink positioning measurement information includes: a downlink RSTD measurement.

Optionally, before obtaining the location information and the downlink positioning measurement information of the reference terminal, the processor is further configured to invoke the program instructions stored in the memory and execute according to an obtained program:

sending downlink positioning reference signal configuration information to a terminal; or sending the downlink positioning reference signal configuration information to the base station, so that the base station forwards the downlink positioning reference signal configuration information to the terminal.

Optionally, when determining the modified downlink positioning measurement information of the target terminal according to the clock offset, the processor is specifically configured to:

notify the base station of the clock offset so that the base station sends a downlink positioning reference signal to the target terminal after correcting the clock offset between base stations; and assign an RSTD reported by the target terminal or a difference between downlink TOAs from base stations reported by the target terminal directly to a modified RSTD;

or, take a difference between an RSTD value reported by the target terminal and the clock offset as the modified downlink positioning measurement information in a location calculation process.

Optionally, the modified uplink positioning measurement information includes an uplink RTOA measurement.

Optionally, before obtaining the location information and the uplink positioning measurement information of the reference terminal, the processor is further configured to invoke the program instructions stored in the memory and execute according to an obtained program:

sending uplink positioning reference signal configuration information to a terminal; or sending the uplink positioning reference signal configuration information to the base station, so that the base station forwards the uplink positioning reference signal configuration information to the terminal.

Optionally, when modifying the uplink positioning measurement information of the target terminal according to the clock offset to determine the modified uplink positioning measurement information of the target terminal, the processor is specifically configured to invoke the program instructions stored in the memory and execute according to an obtained program:

notifying the base station of the clock offset so that the base station receives an uplink sounding reference signal from the target terminal after correcting the clock offset between base stations; and assigning an uplink RTOA reported by the base station directly to a modified RTOA;

or, taking a difference between an uplink RTOA value reported by the base station with respect to the target terminal and the clock offset as the modified uplink positioning measurement information in a location calculation process.

At the target terminal side, a positioning apparatus provided by an embodiment of the present application includes:

a memory configured to store program instructions;

a processor configured to invoke the program instructions stored in the memory and execute according to an obtained program:

determining positioning reference signal configuration information;

for a DL-TDOA positioning method: receiving and measuring downlink positioning reference signals from different base stations based on the positioning reference signal configuration information, determining downlink positioning measurement information, and reporting the downlink positioning measurement information; and/or for an UL-TDOA positioning method: sending an uplink positioning reference signal based on the positioning reference signal configuration information.

Optionally, the downlink positioning measurement information comprises: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the positioning reference signal configuration information is provided by the LMF entity or a base station.

Optionally, the processor is further configured to invoke the program instructions stored in the memory and execute according to an obtained program:

determining and reporting location information of a reference terminal.

At the base station side, a positioning apparatus provided by an embodiment of the present application includes:

a memory configured to store program instructions;

a processor configured to invoke the program instructions stored in the memory and execute according to an obtained program:

sending positioning reference signal configuration information to a terminal;

for a DL-TDOA positioning method: sending a downlink positioning reference signal to a reference terminal, receiving downlink positioning measurement information and location information of the reference terminal reported by the reference terminal, and forwarding the downlink positioning measurement information and the location information of the reference terminal to a Location Management Function, LMF, entity; and/or for an UL-TDOA positioning method: receiving and measuring an uplink positioning reference signal sent by the reference terminal to obtain uplink positioning measurement information, reporting the uplink positioning measurement information to the LMF entity, and forwarding the location information of the reference terminal reported by the reference terminal.

Optionally, the processor is further configured to invoke the program instructions stored in the memory and execute according to an obtained program:

when receiving a clock offset between base stations notified by the LMF entity, correcting a clock offset of a local base station according to the clock offset;

for the DL-TDOA positioning method: sending a downlink positioning reference signal to a target terminal, receiving downlink positioning measurement information reported by the target terminal, and forwarding the downlink positioning measurement information to the LMF entity;

for the UL-TDOA positioning method: receiving and measuring an uplink positioning reference signal sent by the target terminal to obtain uplink positioning measurement information of the target terminal, and reporting the uplink positioning measurement information of the target terminal to the LMF entity.

At the reference terminal side, another positioning apparatus provided by an embodiment of the present application includes:

a configuration information determining unit configured to determine positioning reference signal configuration information;

a first downlink unit configured to, for a DL-TDOA positioning method, receive and measure downlink positioning reference signals from different base stations based on the positioning reference signal configuration information, determine downlink positioning measurement information, and report the downlink positioning measurement information and location information of a reference terminal, so that a Location Management Function, LMF, entity positions a target terminal based on the downlink positioning measurement information and the location information of the reference terminal; and/or a first uplink unit configured to, for an UL-TDOA positioning method, send an uplink positioning reference signal based on the positioning reference signal configuration information, and send the location information of the reference terminal, so that the LMF positions the target terminal based on the uplink positioning reference signal and the location information of the reference terminal.

Optionally, the downlink positioning measurement information comprises: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the location information of the reference terminal is determined by the reference terminal based on pre-configured location information or through an RAT-independent positioning scheme.

Optionally, the positioning reference signal configuration information is provided by the LMF entity or a base station.

At the LMF entity side, another positioning apparatus provided by an embodiment of the present application includes:

a first downlink processing unit configured to, for a DL-TDOA positioning method, receive downlink positioning measurement information and location information of a reference terminal reported by the reference terminal, and receive downlink positioning measurement information reported by a target terminal; and position the target terminal based on the downlink positioning measurement information and the location information of the reference terminal reported by the reference terminal as well as the downlink positioning measurement information reported by the target terminal; and/or a first uplink processing unit configured to, for an UL-TDOA positioning method, receive location information of a reference terminal reported by the reference terminal, and receive uplink positioning measurement information of the reference terminal reported by a base station and uplink positioning measurement information of the target terminal reported by the base station; and position the target terminal based on the uplink positioning measurement information of the reference terminal, the location information of the reference terminal, and the uplink positioning measurement information of the target terminal.

Optionally, the first downlink processing unit is specifically configured to:

determine a clock offset between base stations according to the obtained location information and the downlink positioning measurement information of the reference terminal;

modify the downlink positioning measurement information of the target terminal according to the clock offset to determine modified downlink positioning measurement information of the target terminal;

determine location information of the target terminal according to the modified downlink positioning measurement information of the target terminal.

Optionally, the first uplink processing unit is specifically configured to:

determine a clock offset between base stations according to the obtained location information and the uplink positioning measurement information of the reference terminal;

modify the uplink positioning measurement information of the target terminal according to the clock offset to determine modified uplink positioning measurement information of the target terminal;

determine location information of the target terminal according to the modified uplink positioning measurement information of the target terminal.

Optionally, the modified downlink positioning measurement information includes: a downlink RSTD measurement.

Optionally, the apparatus further includes a first sending unit, where before obtaining the location information and the positioning measurement information of the reference terminal, the first sending unit is configured to:

send downlink positioning reference signal configuration information to a terminal; or send the downlink positioning reference signal configuration information to the base station, so that the base station forwards the downlink positioning reference signal configuration information to the terminal.

Optionally, the first downlink processing unit is specifically configured to:

notify the base station of the clock offset so that the base station sends a downlink positioning reference signal to the target terminal after correcting the clock offset between base stations; and assign an RSTD reported by the target terminal or a difference between downlink TOAs from base stations reported by the target terminal directly to a modified RSTD;

or, take a difference between an RSTD value reported by the target terminal and the clock offset as the modified downlink positioning measurement information in a location calculation process.

Optionally, the modified uplink positioning measurement information includes an uplink RTOA measurement.

Optionally, the apparatus further includes a second sending unit, wherein before obtaining the location information and the uplink positioning measurement information of the reference terminal, the second sending unit is configured to:

send uplink positioning reference signal configuration information to a terminal; or send the uplink positioning reference signal configuration information to the base station, so that the base station forwards the uplink positioning reference signal configuration information to the terminal.

Optionally, the first uplink processing unit is specifically configured to:

notify the base station of the clock offset so that the base station receives an uplink sounding reference signal from the target terminal after correcting the clock offset between base stations; and assign an uplink RTOA reported by the base station directly to a modified RTOA;

or, take a difference between an uplink RTOA value reported by the base station with respect to the target terminal and the clock offset as the modified uplink positioning measurement information in a location calculation process.

At the target terminal side, another positioning apparatus provided by an embodiment of the present application includes:

a configuration information determining unit configured to determine positioning reference signal configuration information;

a second downlink unit configured to, for a DL-TDOA positioning method, receive and measure downlink positioning reference signals from different base stations based on the positioning reference signal configuration information, determine downlink positioning measurement information, and report the downlink positioning measurement information; and/or a second uplink unit configured to, for an UL-TDOA positioning method, send an uplink positioning reference signal based on the positioning reference signal configuration information.

Optionally, the downlink positioning measurement information includes: a downlink positioning measurement and/ or a reliability indication of the downlink positioning measurement, wherein the reliability indication is a standard deviation and/or a variance of an error estimate value of the downlink positioning measurement to indicate reliability of the downlink positioning measurement.

Optionally, the positioning reference signal configuration information is provided by the LMF entity or a base station.

At the base station side, another positioning apparatus provided by an embodiment of the present application includes:

a configuration information sending unit configured to send positioning reference signal configuration information to a terminal;

a second downlink processing unit configured to, for a DL-TDOA positioning method, send a downlink positioning reference signal to a reference terminal, receive downlink positioning measurement information and location information of the reference terminal reported by the reference terminal, and forward the downlink positioning measurement information and the location information of the reference terminal to an LMF entity; and/or a second uplink processing unit configured to, for an UL-TDOA positioning method, receive and measure an uplink positioning reference signal sent by the reference terminal to obtain uplink positioning measurement information, report the uplink positioning measurement information to the LMF entity, and forward the location information of the reference terminal reported by the reference terminal.

Optionally, the apparatus further includes a correction unit when receiving a clock offset between base stations notified by the LMF entity:

the correction unit is configured to correct a clock offset of a local base station according to the clock offset between bases stations;

the second downlink processing unit is specifically configured to, for the DL-TDOA positioning method, send a downlink positioning reference signal to a target terminal, receive downlink positioning measurement information reported by the target terminal, and forward the downlink positioning measurement information to the LMF entity;

the second uplink processing unit is specifically configured to, for the UL-TDOA positioning method, receive and measure an uplink positioning reference signal sent by the target terminal to obtain uplink positioning measurement information of the target terminal, and report the uplink positioning measurement information of the target terminal to the LMF entity.

Another embodiment of the present application provides a computing device, which includes a memory and a processor, where the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

FIG. 6 is a schematic flowchart of a positioning method at the target terminal side according to an embodiment of the present application.

FIG. 7 is a schematic flowchart of a positioning method at the base station side according to an embodiment of the present application.

DETAILED DESCRIPTION

Figure 1:
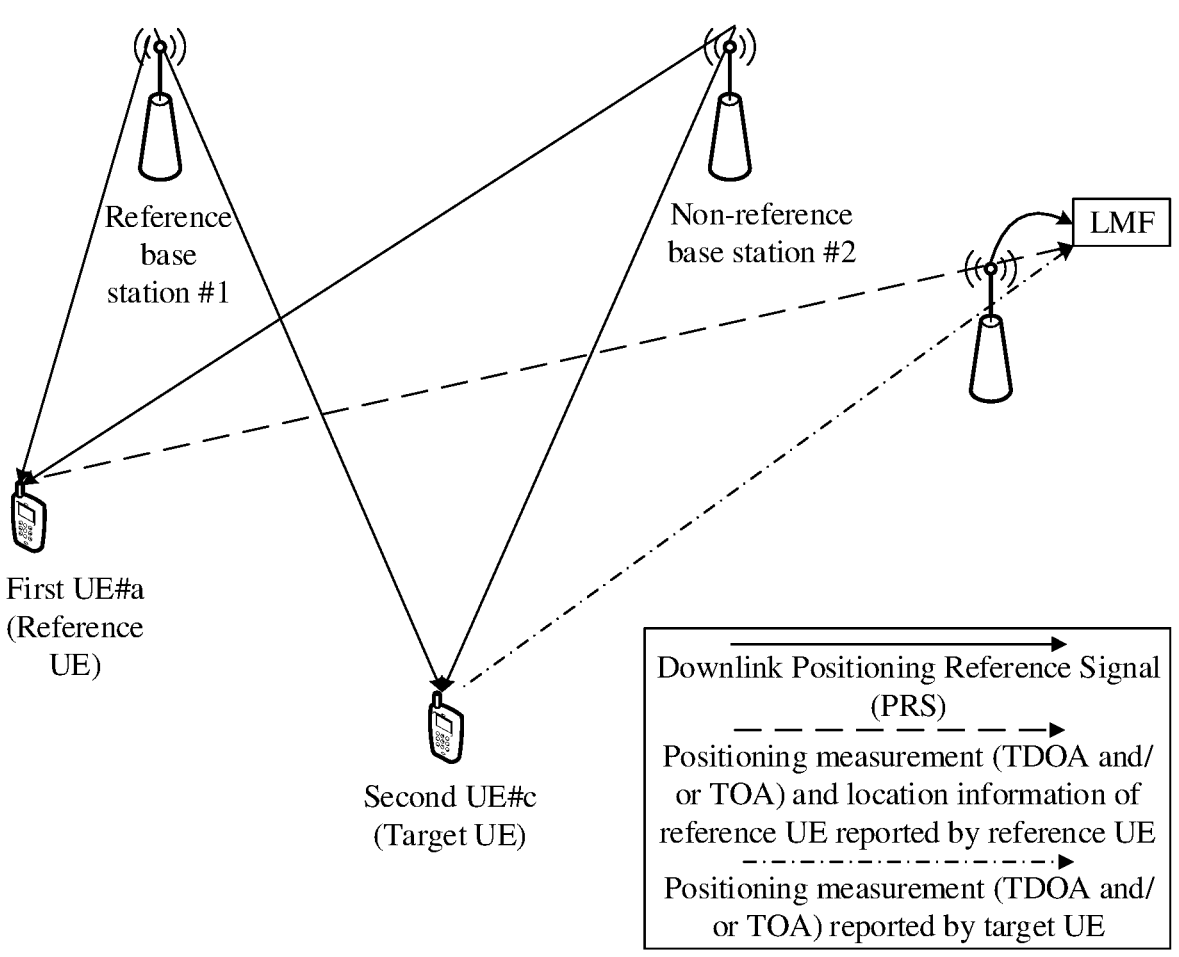
FIG. 1 is a schematic diagram illustrating signal interaction between a base station, a terminal and an LMF entity according to an embodiment of the present application.

The technical solutions in the embodiments of the present application will be described clearly and completely below in combination with the accompanying drawings in the embodiments of the present application. Obviously, the described embodiments are only a part of the embodiments of the present application but not all the embodiments. Based upon the embodiments of the present application, all of other embodiments obtained by those ordinary skilled in the art without creative work pertain to the protection scope of the present application.

In a user terminal positioning system of wireless communication, the clock offset (i.e., time synchronization error) between base stations is one of the key issues that directly affect the positioning performance. The embodiments of the present application provide a positioning method and apparatus, to eliminate the clock offset between base stations based on the reference UE and improve the UE positioning accuracy of the UL-TDOA/DL-TDOA positioning method.

The embodiments of the present application provide a positioning method and apparatus, to eliminate the clock offset between base stations and improve the UE positioning accuracy of the UL-TDOA/DL-TDOA positioning method.

Here, the method and apparatus are based on the same application concept. Since the principle of the method to solve the problem is similar to that of the apparatus, the implementations of the apparatus and method can refer to each other, and the repeated description thereof will be omitted.

The technical solutions provided by the embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as user equipment. The wireless terminal device can communicate with one or more core networks via the Radio Access Network (RAN), and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in the embodiments of the present application.

The network device involved in the embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, wherein the rest of the access network may include IP networks. The network device may further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the technical solutions provided by the embodiments.

For ease of description, the PRS described in the embodiments of the present application represents all reference signals that can be used to measure TOA, including, for example, PRS that can be used for traditional DL-TDOA/UL-TDOA positioning, Channel State Indication Reference Signal (CSI-RS), System Synchronization/Physical Broadcast CHannel Block (SS/PBCH Block), Sounding Reference Signal (SRS) and Physical Random Access CHannel (PRACH), etc. In the embodiments of the present application, such reference signals may be collectively referred to as positioning reference signals.

The technical solution provided by the embodiments of the present application includes the following.

A reference UE firstly obtains the UE location based on the pre-configured UE location or by calculation through an RAT-independent positioning method such as Assisted-Global Navigation Satellite System (A-GNSS), and then processes in two cases as follows.

1) For the DL-TDOA positioning method, the reference UE receives and measures downlink Positioning Reference Signals (PRSs) from different base stations, obtains the downlink positioning measurement information (including but not limited to: downlink RSTD measurement, downlink TOA measurement), and then reports the location information of the reference UE and the downlink positioning measurement information to an LMF entity or a base station.

2) For the UL-TDOA positioning method, the reference UE reports the location information of the reference UE to the LMF or the base station and sends an uplink PRS to the base station, so that the base station receives the uplink PRS sent by the reference UE to obtain the uplink positioning measurement information (that is, uplink RTOA value) and then the base station reports the uplink positioning measurement information and the location information of the reference UE to the LMF.

The reference UE described in the embodiments of the present application is a UE that assists in locating the target UE.

The LMF calculates and obtains a clock offset between base stations based on the location information of the reference UE and the uplink/downlink positioning measurement information reported by the reference UE. Then, the LMF has two processing methods for terminal-assisted (UE-assisted, that is, the reference UE-assisted) positioning as follows.

1) The LMF notifies each base station of the clock offset, and each base station sends a PRS to the target UE or receives an uplink PRS from the target UE after correcting the clock offset.

2) The LMF does not notify each base station of the clock offset, each base station does not correct the clock offset, and the LMF eliminates the influence of the clock offset for the RSTD value reported by the target UE during location calculation.

Since the influence of the clock offset has been eliminated in the processed positioning measurement information (downlink RSTD measurement, or uplink RTOA measurement) of the target UE in the embodiment of the present application, the UE positioning accuracy of the DL-TDOA or UL-TDOA positioning method can be guaranteed.

The technical solution provided by the embodiments of the present application will be described below from different device sides, respectively.

The processing flow at the side of the reference UE (also referred to as the first UE) includes the following steps.

Step 1: The reference UE calculates the location information of the reference UE based on pre-configured location information or through a Radio Access Technology-independent (RAT-independent) positioning scheme (e.g., A-GNSS, etc.).

Step 2: The reference UE receives the downlink PRS configuration information or uplink PRS configuration information provided by the LMF or the base station.

Here, the downlink PRS configuration information includes the time-frequency position of the downlink PRS, the index information of the reference base station, etc.; and the uplink PRS configuration information includes the time-frequency position of the uplink PRS, the index information of the reference base station, etc. The configuration information is communicated via LTE Positioning Protocol (LPP) signaling or Radio Resource Control (RRC) signaling.

Here, the downlink PRS includes New Radio (NR) PRS, Channel State Indication Reference Signal (CSI-RS), System Synchronization/Physical Broadcast CHannel Block (SS/PBCH Block), etc; and the uplink PRS includes Sounding Reference Signal (SRS) and Physical Random Access CHannel (PRACH), etc.

The reference base station mainly refers to a base station for RSTD calculation.

Step 3: The reference UE processes for two cases of DL-TDOA and UL-TDOA positioning methods: for the DL-TDOA positioning methods, proceed to Step 4; and for the UL-TDOA positioning methods, proceed to Step 5.

Step 4: Process for the DL-TDOA positioning method.

Step 4.1: The reference UE receives and measures the downlink Positioning Reference Signals (PRSs) from different base stations, and obtains a downlink positioning measurement (including but not limited to: downlink RSTD, downlink TOA) and/or the reliability indication of the downlink positioning measurement, where the reliability indication is a standard deviation and/or a variance of an error estimate value of the downlink positioning measurement to indicate the reliability of the measurement. The larger the standard deviation and/or variance, the less the reliability; otherwise, the greater the reliability.

Step 4.2: The reference UE reports the downlink positioning measurement and/or the reliability indication of the downlink positioning measurement obtained in Step 4.1 and the location information of the reference UE obtained in Step 1 to the LMF entity or the base station.

Step 5: Process for the UL-TDOA positioning method.

Step 5.1: The reference UE sends an uplink PRS to the base station.

Step 5.2: The reference UE reports the location information of the reference UE obtained in Step 1 to the LMF entity or the base station.

The processing flow at the LMF entity side includes the following.

Step 1: The LMF entity sends the downlink PRS configuration information or the uplink PRS configuration information to a UE, or the LMF sends the downlink PRS configuration information or the uplink PRS configuration information to a base station that then forwards it to the UE.

Step 2: The LMF entity receives the location information of the reference UE reported by the reference UE, and the downlink positioning measurement information (including but not limited to: downlink RSTD measurement, downlink TOA measurement) reported by the reference UE or the uplink positioning measurement information (that is, uplink RTOA value) reported by the base station.

Step 3: The LMF entity calculates a clock offset between base stations according to the location information of the reference UE reported by the reference UE and the downlink positioning measurement information reported by the reference UE or the uplink positioning measurement information reported by the base station received in Step 2.

Without loss of generality, it is assumed that the base station 1 is a reference base station, the base station 2 is a non-reference base station, UE_ref represents the reference UE, T1 represents the clock offset between base station 2 and base station 1, RSTD (base station 2, base station 1→UE_ref) represents the RSTD between base station 2 and base station 1 reported by the reference UE, d (base station 2→UE_ref) and d (base station 1→UE_ref) respectively represent the ideal distance between the base station 2 and the reference UE and the ideal distance between the base station 1 and the reference UE in unit of meter, and c represents the speed of light in unit of meter per second. In the following, according to the different positioning measurement information reported by the reference terminal or the base station, there are three cases (CASEs) to introduce how the LMF calculates the clock offset between base stations.

CASE 1: When the downlink positioning measurement information reported by the reference terminal is a downlink RSTD measurement, two following calculation formulas can be obtained:

$$
\begin{aligned}
\text{RSTD(base station2,base station1} \rightarrow \text{UE\_ref)} \\
= \text{RSTD\_perfect(base station2,base} \\
\text{station1} \rightarrow \text{UE\_ref)} + T1
\end{aligned}
\tag{1}
$$

$$
\begin{aligned}
\text{RSTD\_perfect(base station2,base station1} \rightarrow \text{UE\_ref)} \\
= d(\text{base station2} \rightarrow \text{UE\_ref})/c - d(\text{base} \\
\text{station1} \rightarrow \text{UE\_ref})/c
\end{aligned}
\tag{2}
$$

The clock offset T1 between the base station 2 and the base station 1 can be obtained by combining the calculation formulas (1) and (2).

In CASE1, if there are two or more reference UEs reporting at the same time, the LMF entity processes each clock offset (for example, arithmetic mean, or weighted average based on the reliability indication of positioning measurement, etc.) to obtain the processed clock offset, if the same reference base station is selected when reporting the RSTD (the reference base station is autonomously selected by the reference UE, or the reference base station is configured by the LMF).

If the reference base stations selected by multiple reference UEs are not the same base station, the LMF entity will obtain a clock offset value between any two base stations through a certain algorithm. The basic principle is that the clock offset of any two base stations has a linear relationship.

CASE 2: When the downlink positioning measurement information reported by the reference terminal is downlink TOAs from different base stations to the reference UE, $$TOA(base\ station1 \rightarrow UE\_ref)=TOA\_perfect(base\ station1 \rightarrow UE\_ref)+0 \qquad (3)$$

$$TOA(base\ station2 \rightarrow UE\_ref)=TOA\_perfect(base\ station2 \rightarrow UE\_ref)+T1 \qquad (4)$$

Formula (4)–Formula (3) can yield Formula (1), where RSTD (base station $2$, base station $1 \rightarrow UE\_ref$)=TOA (base station $2 \rightarrow UE\_ref$)–TOA (base station $1 \rightarrow UE\_ref$); and RSTD_perfect=TOA_perfect (base station $2 \rightarrow UE\_ref$)–TOA_perfect (base station $1 \rightarrow UE\_ref$).

Then, the clock offset value T1 between base station $2$ and base station $1$ can be obtained by using the same method as that in CASE1.

In CASE 2, since the reference terminal does not report the downlink RSTD measurement but reports the downlink TOA, if more than two reference UEs report at the same time, the same reference base station is selected for the reference UEs when calculating the RSTD.

CASE 3: When the uplink positioning measurement information reported by the base station is uplink RTOAs obtained by different base stations based on the uplink PRS measurement information, $$RTOA(base\ station1 \rightarrow UE\_ref)=RTOA\_perfect(base\ station1 \rightarrow UE\_ref)+0 \qquad (5)$$

$$RTOA(base\ station2 \rightarrow UE\_ref)=RTOA\_perfect(base\ station2 \rightarrow UE\_ref)+T1 \qquad (6)$$

Formula (6)–Formula (5) can yield Formula (1), where RSTD (UE_ref$\rightarrow$base station $2$, base station $1$)=RTOA (UE_ref$\rightarrow$base station $2$)–RTOA (UE_ref$\rightarrow$base station $1$); and RSTD_perfect=RTOA_perfect (UE_ref$\rightarrow$base Station $2$)–RTOA_perfect (UE_ref$\rightarrow$base station $1$).

Then, the clock offset value T1 between base station $2$ and base station $1$ can be obtained by using the same method as that in CASE1.

In CASE 3, since the base station does not report the downlink RSTD measurement but reports the uplink RTOA for the target terminal, if the base station reports for more than two reference UEs at the same time, the same reference base station is selected for the reference UEs when calculating the modified uplink RTOA.

Step 4: The LMF entity uses one of two following methods for processing based on the clock offset T1 calculated by the LMF entity in Step 3.

Method 1) For terminal-assisted (UE-assisted) positioning, the LMF entity notifies each base station of the clock offset T1, each base station can correct the clock offset between each other, and then the base station sends a downlink PRS to the target UE or receives an uplink PRS from the target UE.

Method 2) For UE-assisted positioning, the LMF entity does not notify each base station of the clock offset T1, each base station does not correct the clock offset between each other, and the LMF entity subtracts the clock offset from the RSTD value reported for the target UE or the uplink RTOA value reported by the base station of the target UE during location calculation.

That is, the difference between the RSTD value reported by the target UE and the clock offset is used as the modified downlink positioning measurement information, or the difference between the uplink RTOA value reported by the base station with respect to the target terminal and the clock offset is used as the modified downlink positioning measurement information.

Step 5: The LMF entity receives the downlink positioning measurement information (including but not limited to: downlink RSTD measurement, downlink TOA measurement) reported by the target UE or the uplink positioning measurement information (RTOA value) reported by the base station, and processes respectively for the two methods in Step 4.

For the Method 1, the downlink RSTD measurement reported by the target UE or the difference between the downlink TOA measurements from two base stations reported by the target UE is directly assigned to the modified RSTD measurement; or, the uplink positioning measurement information (RTOA value) reported by the base station is directly assigned to the modified RTOA measurement.

For the Method 2, the LMF entity performs the operation of eliminating the clock offset in combination with the clock offset T1 between base stations obtained in Step 4, to obtain a modified downlink RSTD measurement or uplink RTOA measurement. The downlink is taken as an example to illustrate below. It is assumed that the base station $1$ is a reference base station, the base station $2$ is a non-reference base station, UE_target represents the target UE, T1 represents the clock offset between base station $2$ and base station $1$ calculated in Step 3, and RSTD (base station $2$, base station $1 \rightarrow UE\_target$) represents the downlink RSTD measurement between base station $2$ and base station $1$ reported by the reference UE. The operation of eliminating the clock offset is as shown in formula (7).

$$RSTD\_modify(base\ station2,base\ station1 \rightarrow UE\_target)=RSTD(base\ station2,base\ station1 \rightarrow UE\_target)-T1 \qquad (7)$$

Step 6: The LMF entity performs the location calculation operation of the target UE (based on the existing Chan algorithm, etc.) based on the modified downlink RSTD measurement or uplink RTOA measurement obtained in Step 5, to obtain the location information of the target UE.

The processing flow of the target UE (also referred to as the second UE) includes the following steps.

Step 1: The target UE receives the downlink PRS configuration information or the uplink PRS configuration information provided by the LMF entity or base station, where the downlink PRS configuration information includes the time-frequency position of the downlink PRS, the index information of the reference base station, etc.; the uplink PRS configuration information includes the time-frequency position of the uplink PRS, the index information of the reference base station, etc; and the configuration information is communicated via LPP signaling or RRC signaling.

Step 2: The target UE processes for two cases of DL-TDOA and UL-TDOA positioning methods: for the DL-TDOA positioning method, proceed to Step 3; and for the UL-TDOA positioning method, proceed to Step 4.

Step 3: Process for the DL-TDOA positioning method.

Step 3.1: The target UE receives and measures the downlink Positioning Reference Signals (PRSs) from different base stations, and obtains a downlink positioning measurement (including but not limited to: downlink RSTD, downlink TOA) and/or a reliability indication of the downlink positioning measurement.

Step 3.2: The target UE reports the downlink positioning measurement and/or the reliability indication of the downlink positioning measurement obtained in Step 3.1 to the LMF.

Step 4: Process for the UL-TDOA positioning method.

Step 4.1: The target UE sends an uplink PRS to the base station.

The processing flow on the base station (applicable to all base stations) side includes the following.

Step 1: The base station receives the downlink PRS configuration information or uplink PRS configuration information sent by the LMF entity, and then forwards the configuration information to the UE.

Step 2: Process for two cases of DL-TDOA and UL-TDOA positioning methods: for the DL-TDOA positioning method, proceed to Step 3; and for the UL-TDOA positioning method, proceed to Step 4.

Step 3: Process for the DL-TDOA positioning method.

Step 3.1: The base station sends a downlink PRS to the reference UE.

Step 3.2: The base station receives the downlink positioning measurement information and the location information of the reference UE reported by the reference UE, and forwards them to the LMF entity, where the downlink positioning measurement information includes but is not limited to: downlink RSTD measurement, downlink TOA measurement.

Step 4: Process for the UL-TDOA positioning method.

Step 4.1: The base station receives and measures an uplink PRS sent by the reference UE to obtain the uplink positioning measurement information (i.e., an uplink RTOA value).

Step 4.2: The base station reports the uplink positioning measurement information to the LMF entity, and forwards the location information of the reference UE reported by the reference UE.

Step 5: based on the Method 1 in Step 4 of the LMF entity, when the base station receives the clock offset T1 notified by the LMF entity, each base station corrects its own clock offset independently and then processes for two cases of DL-TDOA and UL-TDOA positioning methods: for the DL-TDOA positioning method, proceed to Step 6; and for the UL-TDOA positioning method, proceed to Step 7.

Step 6: Process for the DL-TDOA positioning method.

Step 6.1: The base station sends a downlink PRS to the target UE.

Step 6.2: The base station receives the downlink positioning measurement information reported by the target UE, and forwards it to the LMF entity, where the downlink positioning measurement information includes but is not limited to: downlink RSTD measurement, downlink TOA measurement.

Step 7: Process for the UL-TDOA positioning method.

Step 7.1: The base station receives and measures an uplink PRS sent by the target UE to obtain the uplink positioning measurement information (i.e., an uplink RTOA value).

Step 7.2: The base station reports the uplink positioning measurement information to the LMF.

It should be noted that, in the embodiments of the present application, how the reference UE, the target UE and the base station side determine whether to process for the DL-TDOA positioning method or for the UL-TDOA positioning method may be notified by the LMF entity to the reference UE, the target UE and the base station through the positioning signaling, which may be a signaling including the positioning reference signal configuration information or may be a separate signaling. If the positioning signaling is a separate piece of signaling, the positioning signaling may be sent before the positioning reference signal configuration information is sent, to notify the reference UE, the target UE and the base station of a need to process for the DL-TDOA positioning method or a need to process for the UL-TDOA positioning method.

The introduction of several specific embodiments will be given below.

Embodiment 1: Single Reference UE, DL-TDOA Positioning

In Embodiment 1, for a single reference UE, DL-TDOA positioning and UE-assisted positioning, the downlink positioning measurement information reported by the reference terminal is the RSTD value and/or TOA value between different base stations. The LMF entity uses the processing method 1 in step 4: the LMF entity notifies each base station of the clock offset T1, each base station can correct the clock offset, and then the base station sends a PRS.

As shown in FIG. 1, the base station 1 is a reference base station, and the base station 2 is a non-reference base station. The first UE #a is the reference UE dedicated to positioning; and the second UE #c is the target UE.

The processing flow of the first UE #a (reference UE) includes the following.

Step 1: The reference UE obtains the location information of the reference UE based on the pre-configuration, or calculates the location information of the reference UE through the RAT-independent positioning scheme (e.g., A-GNSS, etc.).

Step 2: The reference UE receives the downlink PRS configuration information provided by the LMF entity or base station, where the downlink PRS configuration information includes the time-frequency position of the downlink PRS, the index information of the reference base station, etc., and the configuration information is communicated via LPP signaling or RRC signaling.

Step 3: The reference UE determines the DL-TDOA positioning method, and needs to proceed to Step 4.

Step 4: Process for the DL-TDOA positioning method.

Step 4.1: The reference UE receives and measures the downlink Positioning Reference Signals (PRSs) from different base stations, and obtains a downlink positioning measurement (including but not limited to: an RSTD value between different base stations, TOA values of different base stations) and/or a reliability indication of the downlink positioning measurement.

Step 4.2: The reference UE reports the downlink positioning measurement and/or the reliability indication of the downlink positioning measurement obtained in Step 4.1 and the location information of the reference UE obtained in Step 1 to the LMF entity or the base station.

The processing flow of the LMF entity includes.

Step 1: The LMF entity sends the downlink PRS configuration information or the uplink PRS configuration information to a UE, or the LMF entity sends the downlink PRS configuration information or the uplink PRS configuration information to a base station that then forwards it to the UE.

Step 2: The LMF entity receives the location information of the reference UE and the downlink positioning measurement information (including but not limited to: an RSTD value between different base stations, separate TOA values of different base stations) reported by the reference UE.

Step 3: The LMF entity calculates a clock offset between base stations according to the location information of the reference UE reported by the reference UE and the downlink positioning measurement information reported by the reference UE received in Step 2.

Without loss of generality, it is assumed that the base station 1 is a reference base station, the base station 2 is a non-reference base station, UE_ref represents the reference UE, T1 represents the clock offset between base station 2 and base station 1, RSTD (base station 2, base station 1→UE_ref) represents the RSTD value between base station 2 and base station 1 reported by the reference UE, d (base station 2→UE_ref) and d (base station 1→UE_ref) respectively represent the ideal distances between the base station 2 and base station 1 and the reference UE in unit of meter, and c represents the speed of light in unit of meter per second. In the following, according to the different positioning measurement information reported by the reference terminal, there are two CASEs to introduce how the LMF entity calculates the clock offset between base stations.

CASE 1: When the downlink positioning measurement information reported by the reference terminal is an RSTD value between different base stations, two following calculation formulas can be obtained:

$$RSTD(base\ station2, base\ station1 \rightarrow UE\_ref)$$
$$= RSTD\_perfect(base\ station2, base$$
$$station1 \rightarrow UE\_ref) + T1 \qquad (8)$$

$$RSTD\_perfect(base\ station2, base\ station1 \rightarrow UE\_ref)$$
$$= d(base\ station2 \rightarrow UE\_ref)/c \times d(base$$
$$station1 \rightarrow UE\_ref)/c \qquad (9)$$

The clock offset T1 between the base station 2 and the base station 1 can be obtained by combining the calculation formulas (8) and (9).

CASE 2: When the downlink positioning measurement information reported by the reference terminal is TOA values of different base stations arriving at the reference UE, the following calculation formulas can be obtained:

$$TOA(base\ station1 \rightarrow UE\_ref) = TOA\_perfect(base$$
$$station1 \rightarrow UE\_ref) + 0 \qquad (10)$$

$$TOA(base\ station2 \rightarrow UE\_ref) = TOA\_perfect(base$$
$$station2 \rightarrow UE\_ref) + T1 \qquad (11)$$

Formula (11)–Formula (10) can yield Formula (8), where RSTD (base station 2, base station 1→UE_ref)=TOA (base station 2→UE_ref)–TOA (base station 1→UE_ref); and RSTD_perfect=TOA_perfect (base station 2→UE_ref)–TOA_perfect (base station 1→UE_ref).

Then, the clock offset value T1 between base station 2 and base station 1 can be obtained by using the same method as that in CASE1.

Step 4: The LMF entity uses the following method for processing based on the clock offset T1 calculated by the LMF entity in Step 3.

For UE-assisted positioning, the LMF entity notifies each base station of the clock offset T1, each base station can correct the clock offset, and then the base station sends a downlink PRS to the target UE or receives an uplink PRS from the target UE.

Step 5: The LMF entity receives the downlink positioning measurement information (including but not limited to: downlink RSTD measurement, downlink TOA measurement) reported by the target UE, and performs the following process.

The RSTD value reported by the target UE or the difference between TOA values from two base stations reported by the target UE is directly assigned to the modified RSTD measurement:

$$RSTD\_modify(base\ station2, base$$
$$station1 \rightarrow UE\_target) = RSTD(base\ station2, base$$
$$station1 \rightarrow UE\_target) \qquad (12)$$

Step 6: The LMF entity performs the location calculation operation of the target UE (based on the existing algorithm) based on the modified RSTD measurement obtained in Step 5, to obtain the location information of the target UE.

The processing flow of the second UE #c (target UE) includes the following.

Step 1: The target UE receives the downlink PRS configuration information provided by the LMF entity or base station, where the downlink PRS configuration information includes the time-frequency position of the downlink PRS and the index information of the reference base station, etc., and the configuration information is communicated via LPP signaling or RRC signaling.

Step 2: The target UE determines the DL-TDOA positioning method, and proceeds to Step 3.

Step 3: Process for the DL-TDOA positioning method.

Step 3.1: The target UE receives and measures the downlink Positioning Reference Signals (PRSs) from different base stations, and obtains a downlink positioning measurement (including but not limited to: an RSTD value between different base stations, TOA values of different base stations) and/or a reliability indication of the downlink positioning measurement.

Step 3.2: The target UE reports the downlink positioning measurement information obtained in Step 3 to the LMF entity.

The processing flow of the base station (applicable to the reference base station #1 and the non-reference base station #2) includes the following.

Step 1: The reference base station receives the downlink PRS configuration information or uplink PRS configuration information of the LMF entity, and then forwards the configuration information to the UE.

Step 2: Determine the DL-TDOA positioning method, and proceed to Step 3.

Step 3: Process for the DL-TDOA positioning method.

Step 3.1: The base station sends a downlink PRS to the reference UE.

Step 3.2: The base station receives the downlink positioning measurement information and the location information of the reference UE reported by the reference UE, and forwards them to the LMF entity, where the downlink positioning measurement information includes but is not limited to: an RSTD value between different base stations, separate TOA values of different base stations.

Step 5: Based on Step 4 of the LMF entity, when the base station receives the clock offset T1 notified by the LMF entity, each base station corrects its own clock offset independently and then proceeds to Step 6 for the DL-TDOA positioning method.

Step 6: Process for the DL-TDOA positioning method.

Step 6.1: The base station sends a downlink PRS to the target UE.

Step 6.2: The base station receives the downlink positioning measurement information reported by the target UE, and forwards it to the LMF entity, where the downlink positioning measurement information includes but is not limited to: an RSTD value between different base stations, separate TOA values of different base stations.

Embodiment 2: Multiple Reference UEs, DL-TDOA Positioning

In Embodiment 2, the downlink positioning measurement information reported by the reference terminal is the RSTD value between different base stations. The LMF entity uses the processing method 2 in step 4, that is, the LMF entity does not notify each base station of the clock offset T1, each base station does not correct the clock offset between each other, and the LMF entity subtracts the clock offset from the RSTD value reported for the target UE during location calculation.

Figure 2:
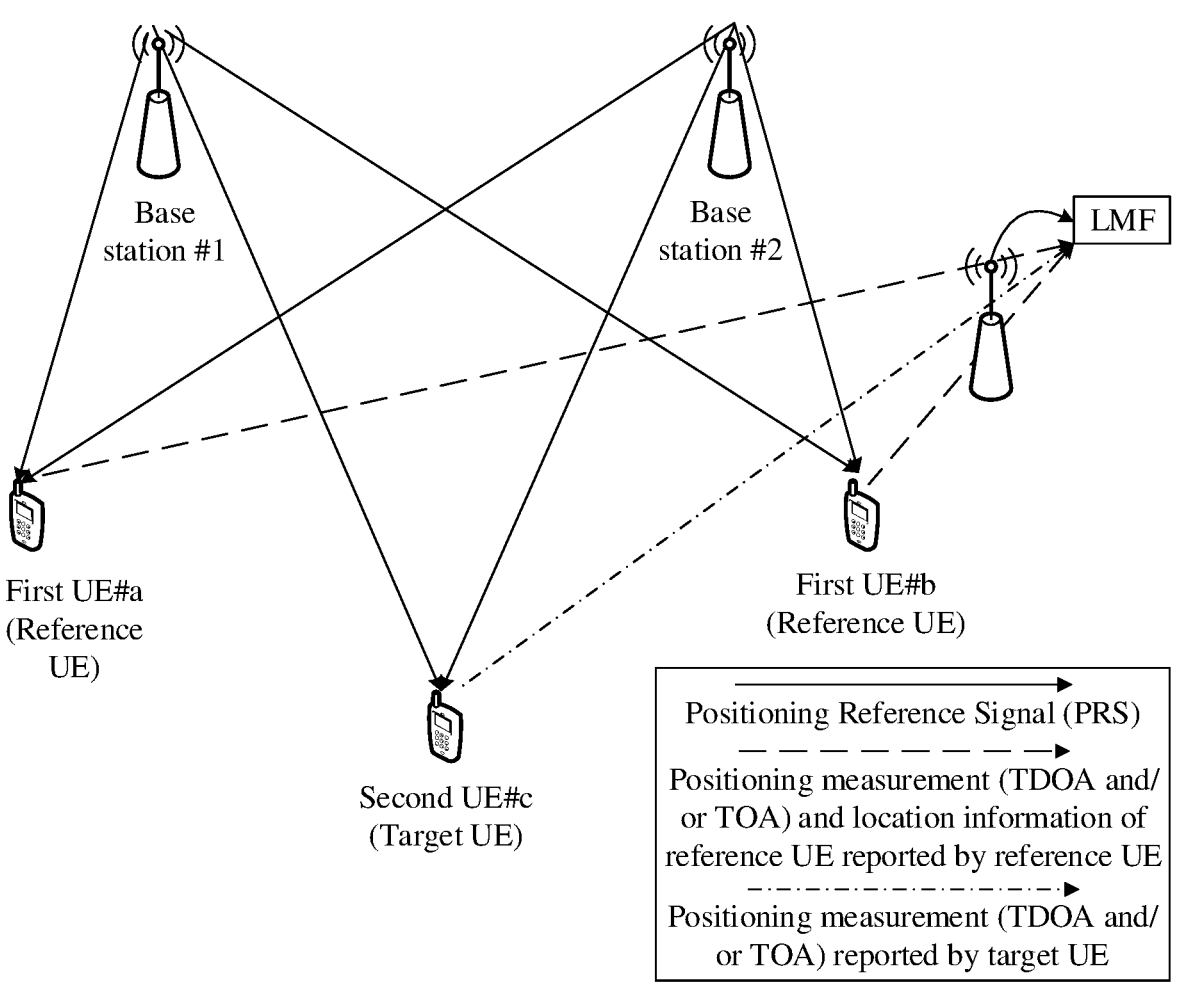
FIG. 2 is another schematic diagram illustrating signal interaction between a base station, a terminal and an LMF entity according to an embodiment of the present application.

As shown in FIG. 2, the first UE #a and the first UE #b are reference UEs dedicated to positioning measurement; and the second UE #c is the target UE.

The processing flow of the first UE (reference UE) includes the following.

Step 1: The reference UE calculates the location information of the reference UE based on the pre-configured location information or through the RAT-independent positioning scheme (e.g., A-GNSS, etc.).

Step 2: Receive the downlink PRS configuration information provided by the LMF entity or base station, where the downlink PRS configuration information includes the time-frequency position of the downlink PRS, the index information of the reference base station, etc., and the configuration information is communicated via LPP signaling or RRC signaling.

Step 3: The reference UE determines the DL-TDOA positioning method, and proceeds to Step 4.

Step 4: Process for the DL-TDOA positioning method.

Step 4.1: The reference UE receives and measures the downlink Positioning Reference Signals (PRSs) from different base stations, and obtains a downlink positioning measurement (including but not limited to: downlink RSTD, downlink TOA) and/or a reliability indication of the downlink positioning measurement.

Step 4.2: The reference UE reports the downlink positioning measurement information obtained in Step 4.1 and the location information of the reference UE obtained in Step 1 to the LMF entity or the base station.

The processing flow of the LMF entity includes the following.

Step 1: The LMF entity sends the downlink PRS configuration information to a UE, or the LMF entity sends the downlink PRS configuration information to a base station that then forwards it to the UE.

Step 2: The LMF entity receives the location information of the reference UE reported by the reference UE, and the downlink positioning measurement information (including but not limited to: downlink RSTD measurement, downlink TOA measurement) reported by the reference UE.

Step 3: The LMF entity calculates a clock offset between base stations according to the location information of the reference UE reported by the reference UE and the downlink positioning measurement information reported by the reference UE received in Step 2.

Without loss of generality, UE_ref represents the reference UEs a and b, T1 represents the clock offset between base station 2 and base station 1, RSTD (base station 2, base station 1→UE_ref) represents the RSTD between base station 2 and base station 1 reported by the reference UE, d (base station 2→UE_ref) and d (base station 1→UE_ref) respectively represent the ideal distances between the base station 2 and base station 1 and the reference UE in unit of meter, and c represents the speed of light in unit of meter per second. In the following, according to the different positioning measurement information reported by the reference terminal or the base station, there are three CASEs to introduce how the LMF entity calculates the clock offset between base stations.

CASE 1: When the reference base stations selected by multiple reference UEs are the same base station (two reference UEs assume that the base station 1 is a reference base station and the base station 2 is a non-reference base station), and when the downlink positioning measurement information reported by the reference terminal a and reference terminal b is the downlink RSTD measurement, four following formulas can be obtained:

$$RSTD(\text{base station2,base station1} \rightarrow \text{UE}a) = RSTD\_perfect(\text{base station2,base station1} \rightarrow \text{UE}a) + T1(a) \quad (13)$$

$$RSTD\_perfect(\text{base station2,base station1} \rightarrow \text{UE}a) = d(\text{base station2} \rightarrow \text{UE}a)/c - d(\text{base station1} \rightarrow \text{UE}a)/c \quad (14)$$

$$RSTD(\text{base station2,base station1} \rightarrow \text{UE}b) = RSTD\_perfect(\text{base station2,base station1} \rightarrow \text{UE}b) + T1(b) \quad (15)$$

$$RSTD\_perfect(\text{base station2,base station1} \rightarrow \text{UE}b) = d(\text{base station2} \rightarrow \text{UE}b)/c - d(\text{base station1} \rightarrow \text{UE}b)/c \quad (16)$$

When the same reference base station is selected during reporting the RSTD (the reference base station is autonomously selected by the reference UE, or the reference base station is configured by the LMF entity):

the clock offset $T1(a)$ between the base station 2 and base station 1 estimated based on the reference UE a can be obtained by combining Formula (13) and Formula (14); and the clock offset $T1(b)$ between the base station 2 and base station 1 estimated based on the reference UE b can be obtained by combining Formula (15) and Formula (16). The LMF entity processes the two clock offsets $T1(a)$ and $T1(b)$ (for example: arithmetic mean, or weighted average based on the reliability indication of the positioning measurement, etc.) to obtain the processed clock offset T1, for example: $T1=(T1(a)+T1(b))/2$, or $T1=(w1*T1(a)+(1-w1)*T1(b))/2$, where w1 is a weighting coefficient, of which the value is between 0 and 1.

CASE 2: When the reference base stations selected by multiple reference UEs are not the same base station, the LMF entity will obtain a clock offset value between any two base stations through an algorithm. The basic principle is that the clock offset of any two base stations has a linear relationship.

The two reference UEs a and b respectively assume that the base station 1 and base station 2 are reference base stations, and the base station 3 is also included in addition to the base station 1 and base station 2.

For the reference UE a, the downlink RSTD measurements of the base station 2 and base station 3 relative to the reference base station 1 can be obtained. It is assumed that $T1(\text{base station 2, base station 1})$ represents the clock offset of the base station 2 relative to the reference base station 1, and $T1(\text{base station 3, base station 1})$ represents the clock offset of the base station 3 relative to the reference base station 1.

$$RSTD(\text{base station2,base station1} \rightarrow \text{UE}a) = RSTD\_perfect(\text{base station2,base station1} \rightarrow \text{UE}a) + T1(\text{base station2,base station1}) \quad (17)$$

$$RSTD\_perfect(\text{base station2,base station1} \rightarrow \text{UE}a) = d(\text{base station2} \rightarrow \text{UE}a)/c - d(\text{base station1} \rightarrow \text{UE}a)/c \quad (18)$$

$$RSTD(\text{base station3,base station1} \rightarrow \text{UE}a) = RSTD\_perfect(\text{base station3,base station1} \rightarrow \text{UE}a) + T1(\text{base station3,base station1}) \quad (19)$$

$$RSTD\_perfect(\text{base station3,base station1} \rightarrow \text{UE}a) = d(\text{base station3} \rightarrow \text{UE}a)/c - d(\text{base station1} \rightarrow \text{UE}a)/c \quad (20)$$

T1(base station 2, base station 1) and T1(base station 3, base station 1) can be obtained by combining the formulas (17) and (20).

For the reference UE b, the downlink RSTD measurements of the base station 1 and base station 3 relative to the reference base station 2 can be obtained. It is assumed that T2(base station 1, base station 2) represents the clock offset of the base station 1 relative to the reference base station 2, and T2(base station 3, base station 2) represents the clock offset of the base station 3 relative to the reference base station 2.

$$RSTD(\text{base station1},\text{base station2}\rightarrow UEa)$$
$$=RSTD\_perfect(\text{base station1},\text{base}$$
$$\text{station2}\rightarrow UEa)+T2(\text{base station1},\text{base station2}) \quad (21)$$

$$RSTD\_perfect(\text{base station1},\text{base station2}\rightarrow UEa)=d$$
$$(\text{base station1}\rightarrow UEa)/c-d(\text{base}$$
$$\text{station2}\rightarrow UEa)/c \quad (22)$$

$$RSTD(\text{base station3},\text{base station2}\rightarrow UEa)$$
$$=RSTD\_perfect(\text{base station3},\text{base}$$
$$\text{station2}\rightarrow UEa)+T2(\text{base station3},\text{base station2}) \quad (23)$$

$$RSTD\_perfect(\text{base station3},\text{base station2}\rightarrow UEa)=d$$
$$(\text{base station3}\rightarrow UEa)/c-d(\text{base}$$
$$\text{station2}\rightarrow UEa)/c \quad (24)$$

T2(base station 1, base station 2) and T2(base station 3, base station 2) can be obtained by combining the formulas (21) and (24).

Therefore, comprehensively considering the clock offset measurements obtained by the reference UE a and reference UE b, the base station 1 is used as a benchmark to adjust the clock offsets of the base station 2 and base station 3 relative to the base station 1, example is shown as follows.

The clock offset of the base station 2 relative to the base station 1 is: (T1(base station 2, base station 1)−T2(base station 1, base station 2))/2.

The clock offset of the base station 3 relative to the base station 1 is: (T1(base station 3, base station 1)+(T2(base station 3, base station 2)−T2(base station 1, base station 2))/2)/2.

In addition to the above method, the weight processing can also be performed combined with the quality indication of the positioning measurement information. For example:

the clock offset of the base station 2 relative to the base station 1 is: (w1\*T1(base station 2, base station 1)−(1−w1) \*T2(base station 1, base station 2))/2;

the clock offset of the base station 3 relative to the base station 1 is: (w1\*T1(base station 3, base station 1)+(1−w1) \*(T2(base station 3, base station 2)−T2(base station 1, base station 2))/2)/2.

Here, w1 is a weighting coefficient, of which the value is between 0 and 1.

Step 4: The LMF entity uses the Method 2 for processing based on the clock offset T1 calculated by the LMF entity in Step 3.

Method 2) For UE-assisted positioning, the LMF entity does not notify each base station of the clock offset T1, each base station does not correct the clock offset between each other, and the LMF entity subtracts the clock offset from the RSTD value reported for the target UE during location calculation.

Step 5: The LMF entity receives the downlink positioning measurement information (including but not limited to: downlink RSTD measurement, downlink TOA measurement) reported by the target UE, and the LMF entity performs the operation of eliminating the clock offset in combination with the clock offset T1 between base stations obtained in Step 4, to obtains a modified RSTD measurement.

Without loss of generality, it is assumed that the base station 1 is a reference base station, the base station 2 is a non-reference base station, UE_target represents the target UE, T1 represents the clock offset between base station 2 and base station 1 calculated in Step 3, and RSTD (base station 2, base station 1→UE_target) represents the downlink RSTD measurement between base station 2 and base station 1 reported by the reference UE. The operation of eliminating the clock offset is as shown in formula (25).

$$RSTD\_modify(\text{base station2},\text{base}$$
$$\text{station1}\rightarrow UE\_target)=RSTD(\text{base station2},\text{base}$$
$$\text{station1}\rightarrow UE\_target)-T1 \quad (25)$$

Step 6: The LMF performs the location calculation operation of the target UE (based on the existing Chan algorithm, etc.) based on the modified RSTD measurement obtained in Step 5, to obtain the location information of the target UE.

The processing flow of the second UE (target UE) includes the following.

Step 1: The target UE receives the downlink PRS configuration information provided by the LMF entity or base station, where the downlink PRS configuration information includes the time-frequency position of the downlink PRS, the index information of the reference base station, etc., and the configuration information is communicated via LPP signaling or RRC signaling.

Step 2: The target UE determines the DL-TDOA positioning method, and proceeds to Step 3.

Step 3: Process for the DL-TDOA positioning method.

Step 3.1: The target UE receives and measures the downlink Positioning Reference Signals (PRSs) from different base stations, and obtains a downlink positioning measurement (including but not limited to: downlink RSTD, downlink TOA) and/or a reliability indication of the downlink positioning measurement.

Step 3.2: The target UE reports the downlink positioning measurement and/or the reliability indication of the downlink positioning measurement obtained in Step 3.1 to the LMF entity.

The processing flow of the base station (applicable to the reference base station and the non-reference base station) includes the following.

Step 1: The reference base station receives the downlink PRS configuration information of the LMF entity, and then forwards the configuration information to the UE.

Step 2: Determine the DL-TDOA positioning method, and proceed to Step 3.

Step 3: Process for the DL-TDOA positioning method.

Step 3.1: The base station sends a downlink PRS to the reference UE.

Step 3.2: The base station receives the downlink positioning measurement information and the location information of the reference UE reported by the reference UE, and forwards them to the LMF entity, where the downlink positioning measurement information includes but is not limited to: downlink RSTD measurement, downlink TOA measurement.

Step 5: Based on Step 4 of the LMF entity, when the base station receives the clock offset T1 notified by the LMF entity, each base station corrects its own clock offset independently and then proceeds to Step 6 for the DL-TDOA positioning method.

Step 6: Process for the DL-TDOA positioning method.

Step 6.1: The base station sends a downlink PRS to the target UE.

Step 6.2: The base station receives the downlink positioning measurement information reported by the target UE, and forwards it to the LMF entity, wherein the downlink positioning measurement information includes but is not limited to: downlink RSTD measurement, downlink TOA measurement.

Embodiment 3: Single Reference UE, UL-TDOA Positioning

In Embodiment 3, for a single reference UE, UL-TDOA positioning and UE-assisted positioning, the base station receives an uplink PRS sent by the reference UE, and obtains the uplink positioning measurement information (uplink RTOA value) and reports it to the LMF entity. The LMF entity uses the processing method 1 in step 4: the LMF entity notifies each base station of the clock offset T1, each base station can correct the clock offset, and then the base station receives the uplink PRS.

Figure 3:
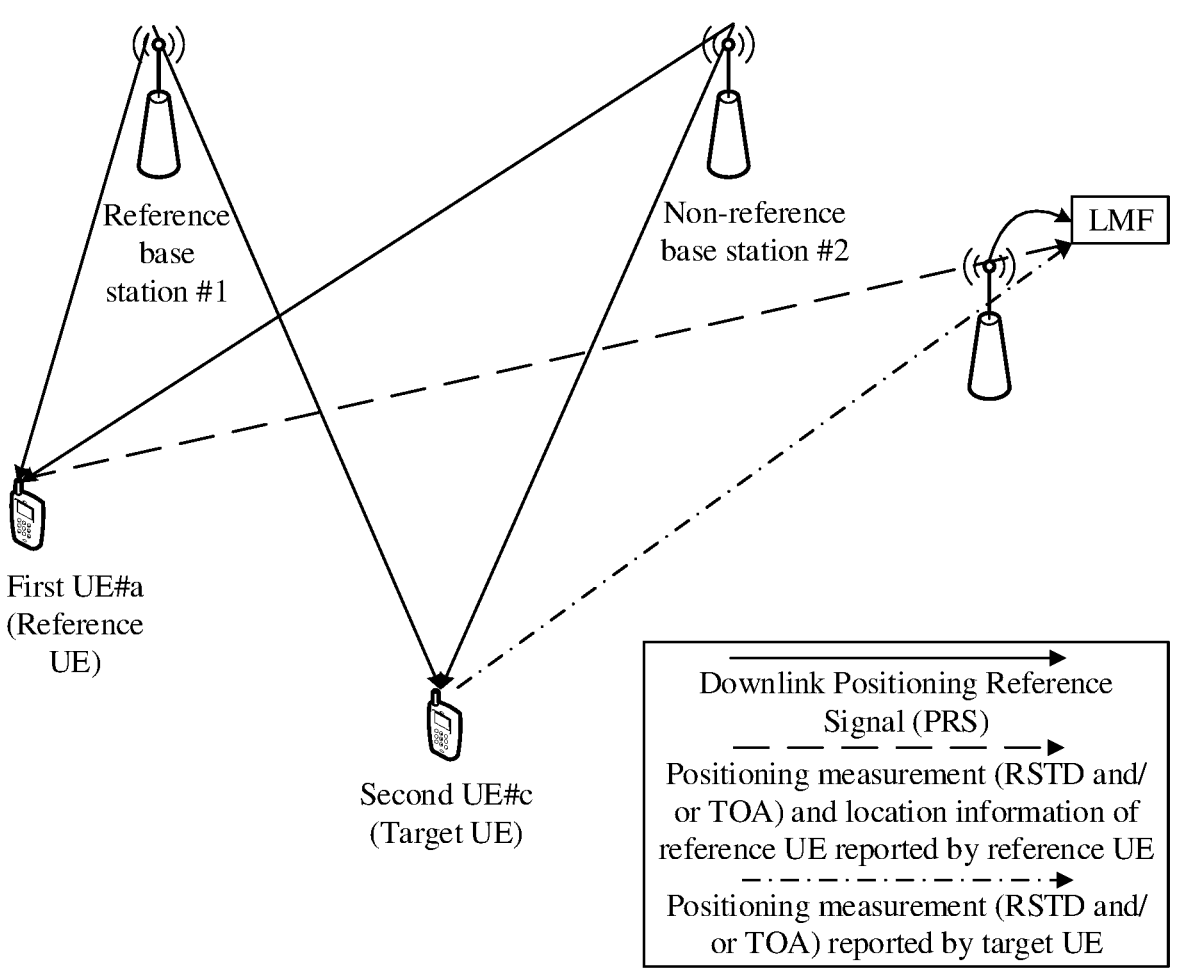
FIG. 3 is a third schematic diagram illustrating signal interaction between a base station, a terminal and an LMF entity according to an embodiment of the present application.

As shown in FIG. 3, the base station 1 is a reference base station, and the base station 2 is a non-reference base station. The first UE a is the reference UE dedicated to positioning; and the second UE c is the target UE.

The processing flow of the first UE (reference UE) includes the following.

Step 1: The reference UE calculates the location information of the reference UE based on the pre-configured location information or through the RAT-independent positioning scheme (e.g., A-GNSS, etc.).

Step 2: Receive the uplink PRS configuration information provided by the LMF entity or base station, where the uplink PRS configuration information includes the time-frequency position of the uplink PRS, the index information of the reference base station, etc., and the configuration information is communicated via LPP signaling or RRC signaling.

Step 3: The reference UE determines to process for the UL-TDOA positioning method, and proceeds to Step 5.

Step 5: Process for the UL-TDOA positioning method.

Step 5.1: The reference UE sends an uplink PRS to the base station.

Step 5.2: The reference UE reports the location information of the reference UE obtained in Step 1 to the LMF entity or the base station.

The processing flow of the LMF entity includes following.

Step 1: The LMF entity sends the uplink PRS configuration information to a UE, or the LMF entity sends the uplink PRS configuration information to a base station that then forwards it to the UE.

Step 2: The LMF entity receives the location information of the reference UE reported by the reference UE, and the uplink positioning measurement information (i.e., uplink RTOA value) reported by the base station.

Step 3: The LMF entity calculates a clock offset between base stations according to the location information of the reference UE reported by the reference UE and the uplink positioning measurement information reported by the base station received in Step 2.

Without loss of generality, it is assumed that the base station 1 is a reference base station, the base station 2 is a non-reference base station, UE_ref represents the reference UE, T1 represents the clock offset between base station 2 and base station 1, RSTD (base station 2, base station 1→UE_ref) represents the RSTD between base station 2 and base station 1 reported by the reference UE, d (base station 2→UE_ref) and d (base station 1→UE_ref) respectively represent the ideal distances between the base station 2 and base station 1 and the reference UE in unit of meter, and c represents the speed of light in unit of meter per second. In the following, how the LMF entity calculates the clock offset between base stations will be introduced according to the event that the positioning measurement information reported by the reference terminal or the base station is uplink RTOAs obtained by measurements of different base stations based on the uplink PRS.

When the uplink positioning measurement information reported by the base station is uplink RTOAs obtained by measurements of different base stations based on the uplink PRS:

$$RTOA(UE\_ref \rightarrow base\ station1)=RTOA\_perfect(base \\ station1 \rightarrow UE\_ref)+0 \tag{26}$$

$$RTOA(UE\_ref \rightarrow base\ station2)=RTOA\_perfect \\ (UE\_ref \rightarrow base\ station2)+T1 \tag{27}$$

$$RTOA\_perfect(UE\_ref \rightarrow base\ station1)=d(UE\_ref \\ \rightarrow base\ station1)/c-TOA\_reference \tag{28}$$

$$RTOA\_perfect(UE\_ref \rightarrow base\ station2)=d(UE\_ref \\ \rightarrow base\ station2)/c-TOA\_reference \tag{29}$$

The clock offset T1 between the base station 2 and the base station 1 can be obtained by combining the solution formulas (26) and (29).

If more than two reference UEs report at the same time, the same reference base station is selected for the reference UEs when calculating the clock offset.

Step 4: The LMF entity uses the following Method 1 for processing based on the clock offset T1 calculated by the LMF entity in Step 3.

Method 1) For UE-assisted positioning, the LMF entity notifies each base station of the clock offset T1, each base station can correct the clock offset, and then the base station sends a downlink PRS to the target UE or receives an uplink PRS from the target UE.

Step 5: The LMF entity receives the uplink positioning measurement information (RTOA value) reported by the base station, and performs the following process for the method in Step 4.

For the Method 1, the LMF entity assigns the uplink positioning measurement information (RTOA value) reported by the base station directly to the modified RTOA measurement.

Step 6: The LMF entity performs the location calculation operation of the target UE (based on the existing Chan algorithm, etc.) based on the modified uplink RTOA measurement obtained in Step 5, to obtain the location information of the target UE.

The processing flow of the second UE (target UE) includes the following.

Step 1: The target UE receives the uplink PRS configuration information provided by the LMF entity or base station, where the uplink PRS configuration information includes the time-frequency position of the uplink PRS, the index information of the reference base station, etc., and the configuration information is communicated via LPP signaling or RRC signaling.

Step 2: The target UE determines to process for the UL-TDOA positioning method, and proceeds to Step 4.

Step 4: Process for the UL-TDOA positioning method.

Step 4.1: The target UE sends an uplink PRS to the base station.

The processing flow of the base station (the reference base station and the non-reference base station) includes the following.

Step 1: The reference base station receives the uplink PRS configuration information of the LMF entity, and then forwards the configuration information to the UE.

Step 2: Determine to process for the UL-TDOA positioning method, and proceed to Step 4.

Step 4: Process for the UL-TDOA positioning method.

Step 4.1: The base station receives and measures an uplink PRS sent by the reference UE to obtain the uplink positioning measurement information (i.e., an uplink RTOA value).

Step 4.2: The base station reports the uplink positioning measurement information to the LMF entity, and forwards the location information of the reference UE reported by the reference UE.

Step 5: Based on the Method 1 in Step 4 of the LMF entity, when the base station receives the clock offset T1 notified by the LMF entity, each base station corrects its own clock offset independently and then proceeds to Step 7 for the UL-TDOA positioning method.

Step 7: Process for the UL-TDOA positioning method.

Step 7.1: The base station receives and measures an uplink PRS sent by the target UE to obtain the uplink positioning measurement information (i.e., an uplink RTOA value).

Step 7.2: The base station reports the uplink positioning measurement information to the LMF entity.

To sum up, the embodiments of the present application propose a solution for eliminating the clock offset between base stations based on the reference UE. Since the influence of the clock offset is eliminated from the RSTD measurement information of the target UE processed by the LMF entity, the UE positioning accuracy of the DL-TDOA positioning method can be improved.

Figure 4:
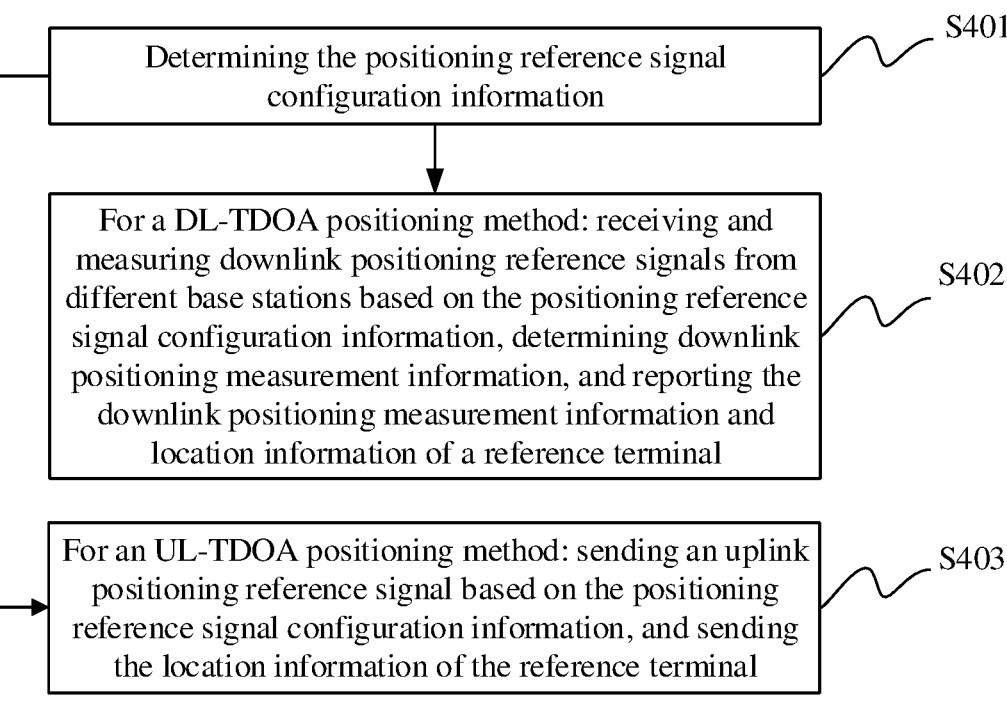
FIG. 4 is a schematic flowchart of a positioning method at the reference terminal side according to an embodiment of the present application.

At the reference terminal side, referring to FIG. 4, a positioning method provided by an embodiment of the present application includes the following steps.

S401: determining the positioning reference signal configuration information.

For example, the reference UE receives the downlink PRS configuration information or uplink PRS configuration information provided by the LMF entity or base station.

S402: for a DL-TDOA positioning method: receiving and measuring downlink positioning reference signals (for example, downlink PRSs) from different base stations based on the positioning reference signal configuration information, determining downlink positioning measurement information, and reporting the downlink positioning measurement information and location information of a reference terminal, so that a LMF entity positions a target terminal based on the downlink positioning measurement information and the location information of the reference terminal.

The reference UE may also report the downlink positioning measurement information and the location information of the reference terminal to the base station, the base station forwards them to the LMF entity, and finally the LMF entity positions the target terminal based on the downlink positioning measurement information and the location information of the reference terminal.

S403: for an UL-TDOA positioning method: sending an uplink positioning reference signal (for example, uplink PRS) based on the positioning reference signal configuration information, and sending the location information of the reference terminal, so that the LMF entity positions the target terminal based on the uplink positioning reference signal and the location information of the reference terminal.

The reference UE may also send an uplink positioning reference signal to the base station, and send the location information of the reference terminal to the LMF entity or the base station. If it is sent to the base station, the base station can forward the location information of the reference terminal to the LMF entity; the base station receives the uplink positioning reference signal, and determines the corresponding uplink positioning measurement information and then sends it to the LMF entity. The LMF entity receives the uplink positioning measurement information and the location information of the reference terminal, and determines a clock offset between base stations based on the uplink positioning measurement information and the location information of the reference terminal; modifies the uplink positioning measurement information of the target terminal according to the clock offset, and determines the modified uplink positioning measurement information of the target terminal; and determines the location information of the target terminal according to the modified uplink positioning measurement information of the target terminal.

Here, the positioning reference signal configuration information includes uplink and/or downlink positioning reference signal configuration information. For the DL-TDOA positioning method, the downlink positioning reference signals from different base stations are received and measured based on the downlink positioning reference signal configuration information; and for the UL-TDOA technical solution, the uplink positioning reference signal is sent based on the uplink positioning reference signal configuration information.

The positioning reference signal described in the embodiments of the present application may be PRS, CSI-RS, SS/PBCH Block, SRS, PRACH, etc., and is not limited to PRS.

Through this method, for the DL-TDOA positioning method, the downlink positioning reference signals from different base stations are received and measured based on the positioning reference signal configuration information, the downlink positioning measurement information is determined, and the downlink positioning measurement information and the location information of the reference terminal are reported; and for the UL-TDOA positioning method, the uplink positioning reference signal is sent based on the positioning reference signal configuration information, and the location information of the reference terminal is sent, so that the LMF entity can calculate a clock offset between base stations based on the location information of the reference UE and the uplink/downlink positioning measurement information reported by the reference UE, and thus eliminate the clock offset between base stations, improving the UE positioning accuracy of the UL-TDOA/DL-TDOA positioning method.

The reference terminal described in the embodiments of the present application, that is, the reference terminal used to locate the target terminal, may be any terminal.

The target terminal described in the embodiments of the present application, that is, the terminal that needs to be located, may also be any terminal.

Optionally, the downlink positioning measurement information includes: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the location information of the reference terminal is determined by the reference terminal based on pre-configured location information or through an RAT-independent positioning scheme.

Optionally, the positioning reference signal configuration information is provided by the LMF entity or a base station.

Figure 5:
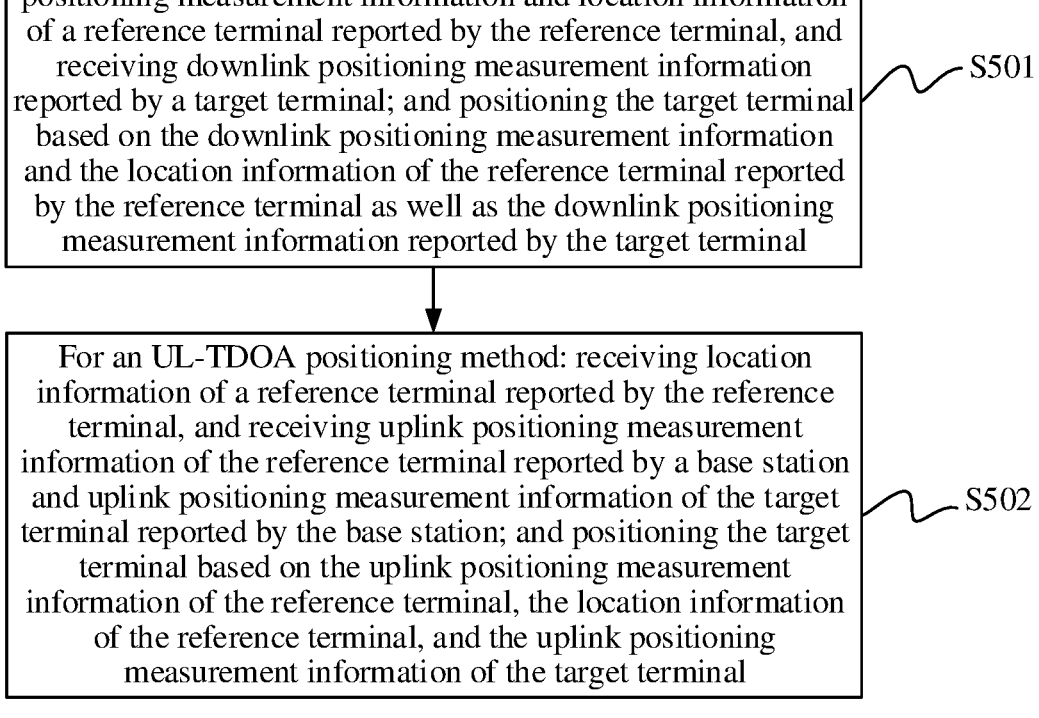
FIG. 5 is a schematic flowchart of a positioning method at the LMF entity side according to an embodiment of the present application.

Referring to FIG. 5, at the LMF entity side, a positioning method provided by an embodiment of the present application includes the following.

S501: for a DL-TDOA positioning method: receiving downlink positioning measurement information and location information of a reference terminal reported by the reference terminal, and receiving downlink positioning measurement information reported by a target terminal; and positioning the target terminal based on the downlink positioning measurement information and the location information of the reference terminal reported by the reference terminal as well as the downlink positioning measurement information reported by the target terminal; and/or

S502: for an UL-TDOA positioning method: receiving location information of a reference terminal reported by the reference terminal, and receiving uplink positioning measurement information of the reference terminal reported by a base station and uplink positioning measurement information of the target terminal reported by the base station; and positioning the target terminal based on the uplink positioning measurement information of the reference terminal, the location information of the reference terminal, and the uplink positioning measurement information of the target terminal.

Optionally, the positioning the target terminal based on the downlink positioning measurement information and the location information of the reference terminal reported by the reference terminal as well as the downlink positioning measurement information reported by the target terminal, includes:

determining a clock offset between base stations according to the obtained location information and the downlink positioning measurement information of the reference terminal;

modifying the downlink positioning measurement information of the target terminal according to the clock offset to determine modified downlink positioning measurement information of the target terminal;

determining location information of the target terminal according to the modified downlink positioning measurement information of the target terminal.

Optionally, the positioning the target terminal based on the uplink positioning measurement information of the reference terminal and the location information of the reference terminal reported by the base station as well as the uplink positioning measurement information of the target terminal reported by the base station, includes:

determining a clock offset between base stations according to the obtained location information and the uplink positioning measurement information of the reference terminal;

modifying the uplink positioning measurement information of the target terminal according to the clock offset to determine modified uplink positioning measurement information of the target terminal;

determining location information of the target terminal according to the modified uplink positioning measurement information of the target terminal.

Optionally, the modified downlink positioning measurement information includes: a downlink RSTD measurement.

Optionally, before obtaining the location information and the downlink positioning measurement information of the reference terminal, the method further includes:

sending downlink positioning reference signal configuration information to a terminal; or sending the downlink positioning reference signal configuration information to the base station, so that the base station forwards the downlink positioning reference signal configuration information to the terminal.

Optionally, the location information of the reference terminal is reported by the reference terminal;

the downlink positioning measurement information is the downlink positioning measurement information reported by the reference terminal.

Optionally, modifying the downlink positioning measurement information of the target terminal according to the clock offset to determine the modified downlink positioning measurement information of the target terminal, specifically includes:

notifying the base station of the clock offset so that the base station sends a downlink positioning reference signal to the target terminal after correcting the clock offset between base stations; and assigning an RSTD reported by the target terminal or a difference between downlink TOAs from base stations reported by the target terminal directly to a modified RSTD;

or, taking a difference between an RSTD value reported by the target terminal and the clock offset as the modified downlink positioning measurement information in a location calculation process.

Optionally, the modified uplink positioning measurement information includes an uplink RTOA measurement.

Optionally, before obtaining the location information and the uplink positioning measurement information of the reference terminal, the method further includes:

sending uplink positioning reference signal configuration information to a terminal; or sending the uplink positioning reference signal configuration information to the base station, so that the base station forwards the uplink positioning reference signal configuration information to the terminal.

Optionally, the modifying the uplink positioning measurement information of the target terminal according to the clock offset to determine the modified uplink positioning measurement information of the target terminal, specifically includes:

notifying the base station of the clock offset so that the base station receives an uplink sounding reference signal from the target terminal after correcting the clock offset between base stations; and assigning an uplink RTOA reported by the base station directly to a modified RTOA;

or, taking a difference between an uplink RTOA value reported by the base station with respect to the target terminal and the clock offset as the modified uplink positioning measurement information in a location calculation process.

Referring to FIG. 6, at the target terminal side, a positioning method provided by an embodiment of the present application includes the following.

S601: determining the positioning reference signal configuration information.

Here, the positioning reference signal configuration information includes uplink and/or downlink positioning reference signal configuration information.

For example, the target UE receives the downlink PRS configuration information or uplink PRS configuration information provided by the LMF entity or base station.

S602: for a DL-TDOA positioning method: receiving and measuring downlink positioning reference signals from different base stations based on the positioning reference signal configuration information, determining downlink positioning measurement information, and reporting the downlink positioning measurement information; and/or S603: for an UL-TDOA positioning method: sending an uplink positioning reference signal based on the positioning reference signal configuration information.

Optionally, the downlink positioning measurement information includes: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the positioning reference signal configuration information is provided by the LMF entity or a base station.

Referring to FIG. 7, at the base station side, a positioning method provided by an embodiment of the present application includes the following.

S701: sending positioning reference signal configuration information to a terminal.

Here, the positioning reference signal configuration information includes uplink and/or downlink positioning reference signal configuration information.

For example, the base station receives the downlink PRS configuration information or uplink PRS configuration information sent by the LMF entity, and then forwards the configuration information to the UE.

S702: for a DL-TDOA positioning method: sending a downlink positioning reference signal to a reference terminal, receiving downlink positioning measurement information and location information of the reference terminal reported by the reference terminal, and forwarding the downlink positioning measurement information and the location information of the reference terminal to an LMF entity.

S703: for an UL-TDOA positioning method: receiving and measuring an uplink positioning reference signal sent by the reference terminal to obtain uplink positioning measurement information, reporting the uplink positioning measurement information to the LMF entity, and forwarding location information of the reference terminal reported by the reference terminal.

Optionally, the method further includes:

when receiving a clock offset between base stations notified by the LMF entity, correcting a clock offset of a local base station according to the clock offset between base stations;

for the DL-TDOA positioning method: sending a downlink positioning reference signal to a target terminal, receiving downlink positioning measurement information reported by the target terminal, and forwarding the downlink positioning measurement information to the LMF entity;

for the UL-TDOA positioning method: receiving and measuring an uplink positioning reference signal sent by the target terminal to obtain uplink positioning measurement information of the target terminal, and reporting the uplink positioning measurement information of the target terminal to the LMF entity.

Figure 8:
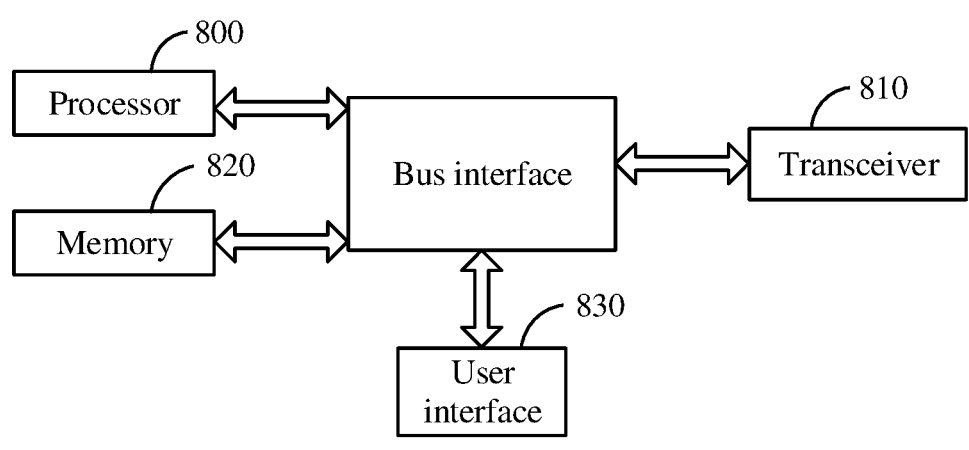
FIG. 8 is a structural schematic diagram of a positioning apparatus at the terminal side according to an embodiment of the present application.

At the reference terminal side, referring to FIG. 8, a positioning apparatus (which may be any type of terminal) provided by an embodiment of the present application includes:

a memory 820 configured to store program instructions;

a processor 800 configured to invoke the program instructions stored in the memory, and execute according to an obtained program:

determining positioning reference signal configuration information;

for a DL-TDOA positioning method: receiving and measuring downlink positioning reference signals from different base stations based on the positioning reference signal configuration information, determining downlink positioning measurement information, and reporting the downlink positioning measurement information and location information of a reference terminal, so that a Location Management Function, LMF, entity positions a target terminal based on the downlink positioning measurement information and the location information of the reference terminal; and/or for an UL-TDOA positioning method: sending an uplink positioning reference signal based on the positioning reference signal configuration information, and sending the location information of the reference terminal, so that the LMF entity positions the target terminal based on the uplink positioning reference signal and the location information of the reference terminal.

Optionally, the downlink positioning measurement information includes: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the location information of the reference terminal is determined by the reference terminal based on pre-configured location information or through an RAT-independent positioning scheme.

Optionally, the positioning reference signal configuration information is provided by the LMF entity or a base station.

A transceiver 810 is configured to receive and send data under the control of the processor 800.

Here, in FIG. 8, the bus architecture may include any numbers of interconnected buses and bridges, and specifically link various circuits of one or more processors represented by the processor 800 and the memory represented by the memory 820. The bus architecture may further link various other circuits such as peripheral device, voltage regulator and power management circuit, which are all well known in the art and thus will not be further described again herein. The bus interface provides an interface. The transceiver 810 may be a plurality of elements, i.e., include a transmitter and a receiver, and provide the units for communicating with various other devices over the transmission media. For different user equipments, the user interface 830 can also be the interface capable of inter-connecting or exter-connecting with the required devices, and the connected devices include but not limited to keypad, display, loudspeaker, microphone, joystick and the like.

The processor 800 is responsible for managing the bus architecture and general processing, and the memory 820 may store the data used by the processor 800 when performing the operations.

Optionally, the processor 800 may be Central Processing Unit (CPU), Application Specific Integrated Circuit (ASIC), Field-Programmable Gate Array (FPGA) or Complex Programmable Logic Device (CPLD).

Figure 9:
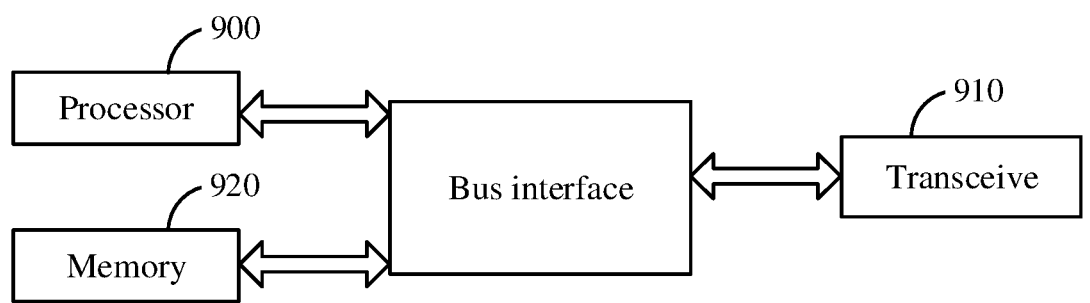
FIG. 9 is a structural schematic diagram of a positioning apparatus at the network side according to an embodiment of the present application.

Referring to FIG. 9, at the network side, a positioning apparatus (which may be an LMF entity) provided by an embodiment of the present application includes:

a memory 920 configured to store program instructions;

a processor 900 configured to invoke the program instructions stored in the memory, and execute according to an obtained program:

for a DL-TDOA positioning method: receiving downlink positioning measurement information and location information of a reference terminal reported by the reference terminal, and receiving downlink positioning measurement information reported by a target terminal; and positioning the target terminal based on the downlink positioning measurement information and the location information of the reference terminal reported by the reference terminal as well as the downlink positioning measurement information reported by the target terminal; and/or for an UL-TDOA positioning method: receiving location information of a reference terminal reported by the reference terminal, and receiving uplink positioning measurement information of the reference terminal reported by a base station and uplink positioning measurement information of the target terminal reported by the base station; and positioning the target terminal based on the uplink positioning measurement information of the reference terminal, the location information of the reference terminal, and the uplink positioning measurement information of the target terminal.

Optionally, the processor 900 is specifically configured to:

determine a clock offset between base stations according to the obtained location information and the downlink positioning measurement information of the reference terminal;

modify the downlink positioning measurement information of the target terminal according to the clock offset to determine modified downlink positioning measurement information of the target terminal;

determine location information of the target terminal according to the modified downlink positioning measurement information of the target terminal.

Optionally, the modified downlink positioning measurement information includes: a downlink RSTD measurement.

Optionally, before obtaining the location information and the downlink positioning measurement information of the reference terminal, the processor 900 is further configured to invoke the program instructions stored in the memory and execute according to an obtained program:

sending downlink positioning reference signal configuration information to a terminal; or sending the downlink positioning reference signal configuration information to the base station, so that the base station forwards the downlink positioning reference signal configuration information to the terminal.

Optionally, according to the clock offset, the processor 900 is specifically configured to:

notify the base station of the clock offset via a transceiver 910 so that the base station sends a downlink positioning reference signal to the target terminal after correcting the clock offset between base stations; and assign an RSTD reported by the target terminal or a difference between downlink TOAs from base stations reported by the target terminal directly to a modified RSTD; or, take a difference between an RSTD value reported by the target terminal and the clock offset as the modified downlink positioning measurement information in a location calculation process.

Optionally, the modified uplink positioning measurement information includes an uplink RTOA measurement.

Optionally, before obtaining the location information and the uplink positioning measurement information of the reference terminal, the processor 900 is further configured to invoke the program instructions stored in the memory 920 and execute according to an obtained program:

sending uplink positioning reference signal configuration information to a terminal; or sending the uplink positioning reference signal configuration information to the base station so that the base station forwards the uplink positioning reference signal configuration information to the terminal.

Optionally, when modifying the uplink positioning measurement information of the target terminal according to the clock offset to determine the modified uplink positioning measurement information of the target terminal, the processor 900 is specifically configured to invoke the program instructions stored in the memory 920 and execute according to an obtained program:

notifying the base station of the clock offset so that the base station receives an uplink sounding reference signal from the target terminal after correcting the clock offset between base stations; and assigning an uplink RTOA reported by the base station directly to a modified RTOA;

or, taking a difference between an uplink RTOA value reported by the base station with respect to the target terminal and the clock offset as the modified uplink positioning measurement information in a location calculation process.

The transceiver 910 is configured to receive and send data under the control of the processor 900.

Here, in FIG. 9, the bus architecture may include any numbers of interconnected buses and bridges, and specifically link various circuits of one or more processors represented by the processor 900 and the memory represented by the memory 920. The bus architecture may further link various other circuits such as peripheral device, voltage regulator and power management circuit, which are all well known in the art and thus will not be further described again herein. The bus interface provides an interface. The transceiver 910 may be a plurality of elements, i.e., include a transmitter and a receiver, and provide the units for communicating with various other devices over the transmission media. The processor 900 is responsible for managing the bus architecture and general processing, and the memory 920 may store the data used by the processor 900 when performing the operations.

The processor 900 may be CPU, ASIC, FPGA or CPLD.

At the target terminal side, a positioning apparatus (which may be any type of terminal) provided by an embodiment of the present application, of which the structure may also refer to FIG. 8, includes:

a memory configured to store program instructions;

a processor configured to invoke the program instructions stored in the memory and execute according to an obtained program:

determining positioning reference signal configuration information;

for a DL-TDOA positioning method: receiving and measuring downlink positioning reference signals from different base stations based on the positioning reference signal configuration information, determining downlink positioning measurement information, and reporting the downlink positioning measurement information;

for an UL-TDOA positioning method: sending an uplink positioning reference signal based on the positioning reference signal configuration information.

Optionally, the downlink positioning measurement information includes: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the positioning reference signal configuration information is provided by the LMF entity or a base station.

Optionally, the processor is further configured to invoke the program instructions stored in the memory and execute according to an obtained program:

determining and reporting location information of a reference terminal.

That is to say, the terminal described in this embodiment of the present application may be used as a reference terminal or a target terminal, and may have the functions of the reference terminal and the target terminal at the same time.

At the network side, another positioning apparatus (which may be a base station) provided by an embodiment of the present application, of which the structure may also refer to FIG. 9, includes:

a memory configured to store program instructions;

a processor configured to invoke the program instructions stored in the memory and execute according to an obtained program:

sending positioning reference signal configuration information to a terminal;

for a DL-TDOA positioning method: sending a downlink positioning reference signal to a reference terminal, receiving downlink positioning measurement information and location information of the reference terminal reported by the reference terminal, and forwarding the downlink positioning measurement information and the location information of the reference terminal to an LMF entity;

for an UL-TDOA positioning method: receiving and measuring an uplink positioning reference signal sent by the reference terminal to obtain uplink positioning measurement information, reporting the uplink positioning measurement information to the LMF entity, and forwarding the location information of the reference terminal reported by the reference terminal.

Optionally, the processor is further configured to invoke the program instructions stored in the memory and execute according to an obtained program:

when receiving a clock offset between base stations notified by the LMF entity, correcting a clock offset of a local base station according to the clock offset between base stations;

for the DL-TDOA positioning method: sending a downlink positioning reference signal to a target terminal, receiving downlink positioning measurement information reported by the target terminal, and forwarding the downlink positioning measurement information to the LMF entity;

for the UL-TDOA positioning method: receiving and measuring an uplink positioning reference signal sent by the target terminal to obtain uplink positioning measurement information of the target terminal, and reporting the uplink positioning measurement information of the target terminal to the LMF entity.

Figure 10:
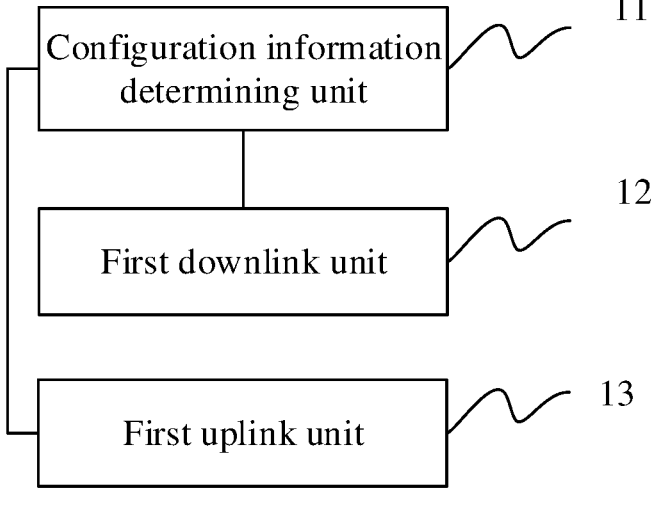
FIG. 10 is a structural schematic diagram of a positioning apparatus at the reference terminal side according to an embodiment of the present application.

At the reference terminal side, referring to FIG. 10, another positioning apparatus provided by an embodiment of the present application includes:

a configuration information determining unit 11 configured to determine positioning reference signal configuration information;

a first downlink unit 12 configured to, for a DL-TDOA positioning method, receive and measure downlink positioning reference signals from different base stations based on the positioning reference signal configuration information, determine downlink positioning measurement information, and report the downlink positioning measurement information and location information of a reference terminal, so that an LMF positions a target terminal based on the downlink positioning measurement information and the location information of the reference terminal; and/or a first uplink unit 13 configured to, for an UL-TDOA positioning method, send an uplink positioning reference signal based on the positioning reference signal configuration information, and send the location information of the reference terminal, so that the LMF positions the target terminal based on the uplink positioning reference signal and the location information of the reference terminal.

Optionally, the downlink positioning measurement information includes: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the location information of the reference terminal is determined by the reference terminal based on pre-configured location information or through an RAT-independent positioning scheme.

Optionally, the positioning reference signal configuration information is provided by the LMF entity or a base station.

Figure 11:
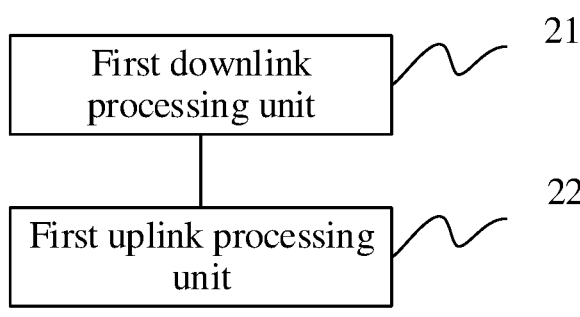
FIG. 11 is a structural schematic diagram of a positioning apparatus at the LMF entity side according to an embodiment of the present application.

At the LMF entity side, referring to FIG. 11, another positioning apparatus provided by an embodiment of the present application includes:

a first downlink processing unit 21 configured to, for a DL-TDOA positioning method, receive downlink positioning measurement information and location information of a reference terminal reported by the reference terminal, and receive downlink positioning measurement information reported by a target terminal; and position the target terminal based on the downlink positioning measurement information and the location information of the reference terminal reported by the reference terminal as well as the downlink positioning measurement information reported by the target terminal; and/or a first uplink processing unit 22 configured to, for an UL-TDOA positioning method, receive location information of a reference terminal reported by the reference terminal, and receive uplink positioning measurement information of the reference terminal reported by a base station and uplink positioning measurement information of the target terminal reported by the base station; and position the target terminal based on the uplink positioning measurement information of the reference terminal, the location information of the reference terminal, and the uplink positioning measurement information of the target terminal.

Optionally, the first downlink processing unit 21 is specifically configured to:

determine a clock offset between base stations according to the obtained location information and the downlink positioning measurement information of the reference terminal;

modify the downlink positioning measurement information of the target terminal according to the clock offset to determine modified downlink positioning measurement information of the target terminal;

determine location information of the target terminal according to the modified downlink positioning measurement information of the target terminal.

Optionally, the first uplink processing unit 22 is specifically configured to:

determine a clock offset between base stations according to the obtained location information and the uplink positioning measurement information of the reference terminal;

modify the uplink positioning measurement information of the target terminal according to the clock offset to determine modified uplink positioning measurement information of the target terminal;

determine location information of the target terminal according to the modified uplink positioning measurement information of the target terminal.

Optionally, the modified downlink positioning measurement includes: a downlink RSTD measurement.

Optionally, the apparatus further includes a first sending unit, wherein before obtaining the location information and the downlink positioning measurement information of the reference terminal, the first sending unit is configured to:

send downlink positioning reference signal configuration information to a terminal; or send the downlink positioning reference signal configuration information to the base station, so that the base station forwards the downlink positioning reference signal configuration information to the terminal.

Optionally, the first downlink processing unit 21 is specifically configured to:

notify the base station of the clock offset so that the base station sends a downlink positioning reference signal to the target terminal after correcting the clock offset between base stations; and assign an RSTD reported by the target terminal or a difference between downlink TOAs from base stations reported by the target terminal directly to a modified RSTD;

or, take a difference between an RSTD value reported by the target terminal and the clock offset as the modified downlink positioning measurement information in a location calculation process.

Optionally, the modified uplink positioning measurement information includes an uplink RTOA measurement.

Optionally, the apparatus further includes a second sending unit, wherein before obtaining the location information and the uplink positioning measurement information of the reference terminal, the second sending unit is configured to:

send uplink positioning reference signal configuration information to a terminal; or send the uplink positioning reference signal configuration information to the base station, so that the base station forwards the uplink positioning reference signal configuration information to the terminal.

Optionally, the first uplink processing unit 22 is specifically configured to:

notify the base station of the clock offset so that the base station receives an uplink sounding reference signal from the target terminal after correcting the clock offset between base stations; and assign an uplink RTOA reported by the base station directly to a modified RTOA;

or, take a difference between an uplink RTOA value reported by the base station with respect to the target terminal and the clock offset as the modified uplink positioning measurement information in a location calculation process.

Figure 12:
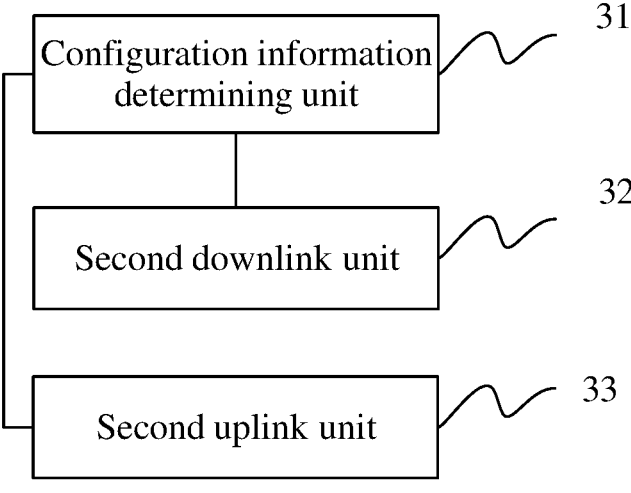
FIG. 12 is a structural schematic diagram of a positioning apparatus at the target terminal side according to an embodiment of the present application.

At the target terminal side, referring to FIG. 12, another positioning apparatus provided by an embodiment of the present application includes:

a configuration information determining unit 31 configured to determine positioning reference signal configuration information;

a second downlink unit 32 configured to, for a DL-TDOA positioning method, receive and measure downlink positioning reference signals from different base stations based on the positioning reference signal configuration information, determine downlink positioning measurement information, and report the downlink positioning measurement information; and/or a second uplink unit 33 configured to, for an UL-TDOA positioning method, send an uplink positioning reference signal based on the positioning reference signal configuration information.

Optionally, the downlink positioning measurement information includes: a downlink positioning measurement and/or a reliability indication of the downlink positioning measurement, where the reliability indication is a standard deviation and/or a variance of an error estimate value of the downlink positioning measurement to indicate reliability of the downlink positioning measurement.

Optionally, the positioning reference signal configuration information is provided by the LMF entity or a base station.

Figure 13:
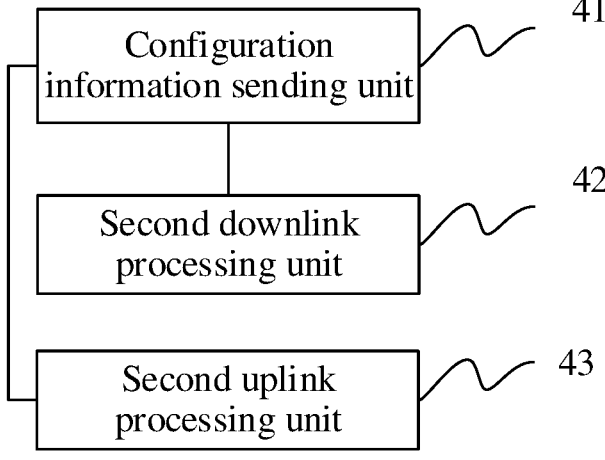
FIG. 13 is a structural schematic diagram of a positioning apparatus at the network side according to an embodiment of the present application.

At the base station side, referring to FIG. 13, another positioning apparatus provided by an embodiment of the present application includes:

a configuration information sending unit 41 configured to send positioning reference signal configuration information to a terminal;

a second downlink processing unit 42 configured to, for a DL-TDOA positioning method, send a downlink positioning reference signal to a reference terminal, receive downlink positioning measurement information and location information of the reference terminal reported by the reference terminal, and forward the downlink positioning measurement information and the location information of the reference terminal to an LMF entity;

a second uplink processing unit 43 configured to, for an UL-TDOA positioning method, receive and measure an uplink positioning reference signal sent by the reference terminal to obtain uplink positioning measurement information, report the uplink positioning measurement information to the LMF entity, and forward the location information of the reference terminal reported by the reference terminal.

Optionally, the apparatus further includes: a clock offset correction unit configured to, when receiving the clock offset between base stations notified by the LMF entity, correct a clock offset of a local base station according to the clock offset between base stations;

the second downlink processing unit 42 is further configured to: for the DL-TDOA positioning method, send a downlink positioning reference signal to a target terminal, receive downlink positioning measurement information reported by the target terminal, and forward the downlink positioning measurement information to the LMF entity;

the second uplink processing unit 43 is further configured to: for the UL-TDOA positioning method, receive and measure an uplink positioning reference signal sent by the target terminal to obtain uplink positioning measurement information of the target terminal, and report the uplink positioning measurement information of the target terminal to the LMF entity.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the technical solution of the present application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A positioning method, comprising:

determining positioning reference signal configuration information;

receiving and measuring downlink positioning reference signals from different base stations based on the positioning reference signal configuration information, determining downlink positioning measurement information, and reporting the downlink positioning measurement information and location information of a reference terminal, wherein the downlink positioning measurement information and the location information of the reference terminal are used for a Location Management Function (LMF) entity to determine a clock offset between base stations, modify downlink positioning measurement information of a target terminal according to the clock offset to determine modified downlink positioning measurement information of the target terminal, and determine location information of the target terminal according to the modified downlink positioning measurement information of the target terminal, wherein, (i) the downlink positioning measurement information of the target terminal is modified by notifying a base station of the clock offset so that the base station sends a downlink positioning reference signal to the target terminal after correcting the clock offset between base stations, and assigning a reference signal time difference (RSTD) reported by the target terminal or a difference between downlink times of arrival (TOAs) from base stations reported by the target terminal directly to a modified RSTD; or (ii) the downlink positioning measurement information of the target terminal is modified by taking a difference between an RSTD value reported by the target terminal and the clock offset as the modified downlink positioning measurement information in a location calculation process.

2. The method according to claim 1, wherein the downlink positioning measurement information comprises: a downlink positioning measurement and/or a reliability indication of the downlink positioning measurement, wherein the reliability indication is a standard deviation and/or a variance of an error estimate value of the downlink positioning measurement to indicate reliability of the downlink positioning measurement.

3. The method according to claim 1, wherein the location information of the reference terminal is determined by the reference terminal based on pre-configured location information or through a Radio Access Technology-independent (RAT-independent) positioning scheme.

4. The method according to claim 1, wherein the positioning reference signal configuration information is provided by the LMF entity or a base station.

5. A positioning method, comprising:

receiving downlink positioning measurement information and location information of a reference terminal reported by the reference terminal, and receiving downlink positioning measurement information reported by a target terminal; and positioning the target terminal based on the downlink positioning measurement information and the location information of the reference terminal reported by the reference terminal as well as the downlink positioning measurement information reported by the target terminal; and/or receiving the location information of the reference terminal reported by the reference terminal, and receiving uplink positioning measurement information of the reference terminal reported by a base station and uplink positioning measurement information of the target terminal reported by the base station; and positioning the target terminal based on the uplink positioning measurement information of the reference terminal, the location information of the reference terminal, and the uplink positioning measurement information of the target terminal;

wherein the positioning the target terminal based on the downlink positioning measurement information and the location information of the reference terminal reported by the reference terminal as well as the downlink positioning measurement information reported by the target terminal, comprises:

determining a clock offset between base stations according to the obtained location information and the downlink positioning measurement information of the reference terminal;

modifying the downlink positioning measurement information of the target terminal according to the clock offset to determine modified downlink positioning measurement information of the target terminal;

determining location information of the target terminal according to the modified downlink positioning measurement information of the target terminal;

wherein modifying the downlink positioning measurement information of the target terminal according to the clock offset to determine the modified downlink positioning measurement information of the target terminal, comprises:

notifying the base station of the clock offset so that the base station sends a downlink positioning reference signal to the target terminal after correcting the clock offset between base stations; and assigning a reference signal time difference (RSTD) reported by the target terminal or a difference between downlink times of arrival (TOAs) from base stations reported by the target terminal directly to a modified RSTD; or taking a difference between an RSTD value reported by the target terminal and the clock offset as the modified downlink positioning measurement information in a location calculation process.

6. The method according to claim 5, wherein the positioning the target terminal based on the uplink positioning measurement information of the reference terminal and the location information of the reference terminal reported by the base station as well as the uplink positioning measurement information of the target terminal reported by the base station, comprises:

determining a clock offset between base stations according to the obtained location information and the uplink positioning measurement information of the reference terminal;

modifying the uplink positioning measurement information of the target terminal according to the clock offset to determine modified uplink positioning measurement information of the target terminal;

determining location information of the target terminal according to the modified uplink positioning measurement information of the target terminal;

wherein the modifying the uplink positioning measurement information of the target terminal according to the clock offset to determine the modified uplink positioning measurement information of the target terminal, comprises:

notifying the base station of the clock offset so that the base station receives an uplink sounding reference signal from the target terminal after correcting the clock offset between base stations; and assigning an uplink Relative Time Of Arrival (RTOA) reported by the base station directly to a modified RTOA; or taking a difference between an uplink RTOA value reported by the base station with respect to the target terminal and the clock offset as the modified uplink positioning measurement information in a location calculation process.

7. The method according to claim 6, wherein the modified uplink positioning measurement information comprises an uplink Relative Time Of Arrival (RTOA) measurement;

or wherein before obtaining the location information and the uplink positioning measurement information of the reference terminal, the method further comprises:

sending uplink positioning reference signal configuration information to a terminal; or sending the uplink positioning reference signal configuration information to the base station, so that the base station forwards the uplink positioning reference signal configuration information to the terminal.

8. The method according to claim 5, wherein the modified downlink positioning measurement information comprises: a downlink Reference Signal Time Difference (RSTD) measurement;

or wherein before obtaining the location information and the downlink positioning measurement information of the reference terminal, the method further comprises:

sending downlink positioning reference signal configuration information to a terminal; or sending the downlink positioning reference signal configuration information to the base station, so that the base station forwards the downlink positioning reference signal configuration information to the terminal.

9. A positioning apparatus, comprising:

a memory configured to store program instructions;

a processor configured to invoke the program instructions stored in the memory and execute the method according claim 5.

10. The apparatus according to claim 9, wherein when positioning the target terminal based on the uplink positioning measurement information of the reference terminal and the location information of the reference terminal reported by the base station as well as the uplink positioning measurement information of the target terminal reported by the base station, the processor is configured to invoke the program instructions stored in the memory and execute according to an obtained program:

determining a clock offset between base stations according to the obtained location information and the uplink positioning measurement information of the reference terminal;

modifying the uplink positioning measurement information of the target terminal according to the clock offset to determine modified uplink positioning measurement information of the target terminal;

determining location information of the target terminal according to the modified uplink positioning measurement information of the target terminal;

wherein the modifying the uplink positioning measurement information of the target terminal according to the clock offset to determine the modified uplink positioning measurement information of the target terminal, comprises:

notifying the base station of the clock offset so that the base station receives an uplink sounding reference signal from the target terminal after correcting the clock offset between base stations; and assigning an uplink Relative Time Of Arrival (RTOA) reported by the base station directly to a modified RTOA; or taking a difference between an uplink RTOA value reported by the base station with respect to the target terminal and the clock offset as the modified uplink positioning measurement information in a location calculation process.

11. A positioning method, comprising:

determining positioning reference signal configuration information;

receiving and measuring downlink positioning reference signals from different base stations based on the positioning reference signal configuration information, determining downlink positioning measurement information, and reporting the downlink positioning measurement information, wherein the downlink positioning measurement information is used for a Location Management Function (LMF) entity to modify the downlink positioning measurement information of a target terminal according to a clock offset between base stations to determine modified downlink positioning measurement information of the target terminal, and determine location information of the target terminal according to the modified downlink positioning measurement information of the target terminal, wherein the clock offset is determined according to location information of a reference terminal and downlink positioning measurement information of the reference terminal, wherein, (i) the downlink positioning measurement information of the target terminal is modified by notifying a base station of the clock offset so that the base station sends a downlink positioning reference signal to the target terminal after correcting the clock offset between base stations, and assigning a reference signal time difference (RSTD) reported by the target terminal or a difference between downlink times of arrival (TOAs) from base stations reported by the target terminal directly to a modified RSTD; or (ii) the downlink positioning measurement information of the target terminal is modified by taking a difference between an RSTD value reported by the target terminal and the clock offset as the modified downlink positioning measurement information in a location calculation process.

12. The method according to claim 11, wherein the downlink positioning measurement information comprises: a downlink positioning measurement and/or a reliability indication of the downlink positioning measurement, wherein the reliability indication is a standard deviation and/or a variance of an error estimate value of the downlink positioning measurement to indicate reliability of the downlink positioning measurement.

13. The method according to claim 11, wherein the positioning reference signal configuration information is provided by a Location Management Function (LMF) entity or a base station.

14. A positioning apparatus, comprising:
a memory configured to store program instructions;
a processor configured to invoke the program instructions stored in the memory and execute the method according to claim 11.

15. A positioning apparatus, comprising:
a memory configured to store program instructions;
a processor configured to invoke the program instructions stored in the memory and execute according to an obtained program:
determining positioning reference signal configuration information;
receiving and measuring downlink positioning reference signals from different base stations based on the positioning reference signal configuration information, determining downlink positioning measurement information, and reporting the downlink positioning measurement information and location information of a reference terminal, wherein the downlink positioning measurement information and the location information of the reference terminal are used for a Location Management Function (LMF) entity to determine a clock offset between base stations, modify downlink positioning measurement information of a target terminal according to the clock offset to determine modified downlink positioning measurement information of the target terminal, and determine location information of the target terminal according to the modified downlink positioning measurement information of the target terminal, wherein, (i) the downlink positioning measurement information of the target terminal is modified by notifying a base station of the clock offset so that the base station sends a downlink positioning reference signal to the target terminal after correcting the clock offset between base stations, and assigning a reference signal time difference (RSTD) reported by the target terminal or a difference between downlink times of arrival (TOAs) from base stations reported by the target terminal directly to a modified RSTD; or (ii) the downlink positioning measurement information of the target terminal is modified by taking a difference between an RSTD value reported by the target terminal and the clock offset as the modified downlink positioning measurement information in a location calculation process.

16. The apparatus according to claim 15, wherein the downlink positioning measurement information comprises: a downlink positioning measurement and/or a reliability indication of the downlink positioning measurement, wherein the reliability indication is a standard deviation and/or a variance of an error estimate value of the downlink positioning measurement to indicate reliability of the downlink positioning measurement.

17. The apparatus according to claim 15, wherein the location information of the reference terminal is determined by the reference terminal based on pre-configured location information or through a Radio Access Technology-independent (RAT-independent) positioning scheme.

18. The apparatus according to claim 15, wherein the positioning reference signal configuration information is provided by the LMF entity or a base station.

* * * * *